United States Patent
Yokoyama et al.

(10) Patent No.: US 6,943,990 B1
(45) Date of Patent: Sep. 13, 2005

(54) HEAD SUPPORT MECHANISM, INFORMATION RECORDING/REPRODUCING APPARATUS, AND METHOD OF MANUFACTURING HEAD SUPPORT MECHANISM

(75) Inventors: Kazuo Yokoyama, Osaka (JP); Shinichi Yamamoto, Osaka (JP); Yousuke Irie, Nara (JP); Hideki Kuwajima, Kyoto (JP); Kenichi Sakamoto, Osaka (JP); Kaoru Matsuoka, Osaka (JP); Isaku Kanno, Nara (JP); Satoru Fujii, Osaka (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 0 days.

(21) Appl. No.: 09/787,480

(22) PCT Filed: Sep. 16, 1999

(86) PCT No.: PCT/JP99/05061

§ 371 (c)(1),
(2), (4) Date: Jun. 11, 2001

(87) PCT Pub. No.: WO00/16318

PCT Pub. Date: Mar. 23, 2000

(30) Foreign Application Priority Data

| Sep. 16, 1998 | (JP) | 10-261147 |
| Nov. 25, 1998 | (JP) | 10-334802 |
| Feb. 26, 1999 | (JP) | 11-052015 |

(51) Int. Cl.$^7$ ............................................. G11B 21/24
(52) U.S. Cl. .................................................. 360/294.4
(58) Field of Search ................ 360/294.4, 294.6, 360/294.7, 294.3, 264.5, 246.7, 294.2

(56) References Cited

U.S. PATENT DOCUMENTS

| 4,374,402 A | 2/1983 | Blessom et al. |
| 4,858,040 A | 8/1989 | Hazebrouck |
| 5,325,244 A | 6/1994 | Takano et al. |
| 5,325,245 A | 6/1994 | Shimizu et al. |
| 5,745,319 A | 4/1998 | Takekado et al. |
| 5,801,906 A * | 9/1998 | Yanagisawa et al. ..... 360/246.1 |
| 6,421,211 B1 * | 7/2002 | Hawwa et al. ............ 360/294.4 |
| 6,512,659 B1 * | 1/2003 | Hawwa et al. ............ 360/294.6 |
| 6,515,834 B1 * | 2/2003 | Murphy .................... 360/294.4 |
| 6,535,360 B1 * | 3/2003 | Kim et al. ................. 360/294.3 |
| 6,541,931 B2 * | 4/2003 | Ho et al. ..................... 318/560 |
| 6,542,337 B2 * | 4/2003 | Maikuma .................. 360/294.4 |

FOREIGN PATENT DOCUMENTS

| DE | 196 07 379 | 9/1996 |
| JP | 58-118024 | 7/1983 |
| JP | 62-287480 | 12/1987 |
| JP | 63-291271 | 11/1988 |
| JP | 05-303859 | 11/1993 |
| JP | 9-73746 | 3/1997 |
| JP | 9-231538 | 9/1997 |
| JP | 9-265738 | 10/1997 |
| JP | 10-134534 | 5/1998 |
| JP | 10-177772 | 6/1998 |
| JP | 10-209517 | 8/1998 |

OTHER PUBLICATIONS

Soeno et al., "Design and Performan of Piezoelectric Piggyback Actuator for High Density HDD", 1998, pp 208–209.

European Search Report dated Nov. 27, 2002, application No. EP 99943376.

* cited by examiner

Primary Examiner—Allen Cao
(74) Attorney, Agent, or Firm—RatnerPrestia

(57) ABSTRACT

A head support mechanism includes a head and a slider for carrying the head, the head being caused to track by main driver, wherein the head support mechanism further includes sub-driving device including a thin film and causing the head to have a micro-movement; and the sub-driving device causes the head to have a micro-movement by utilizing flexural deformation of the thin film.

68 Claims, 36 Drawing Sheets

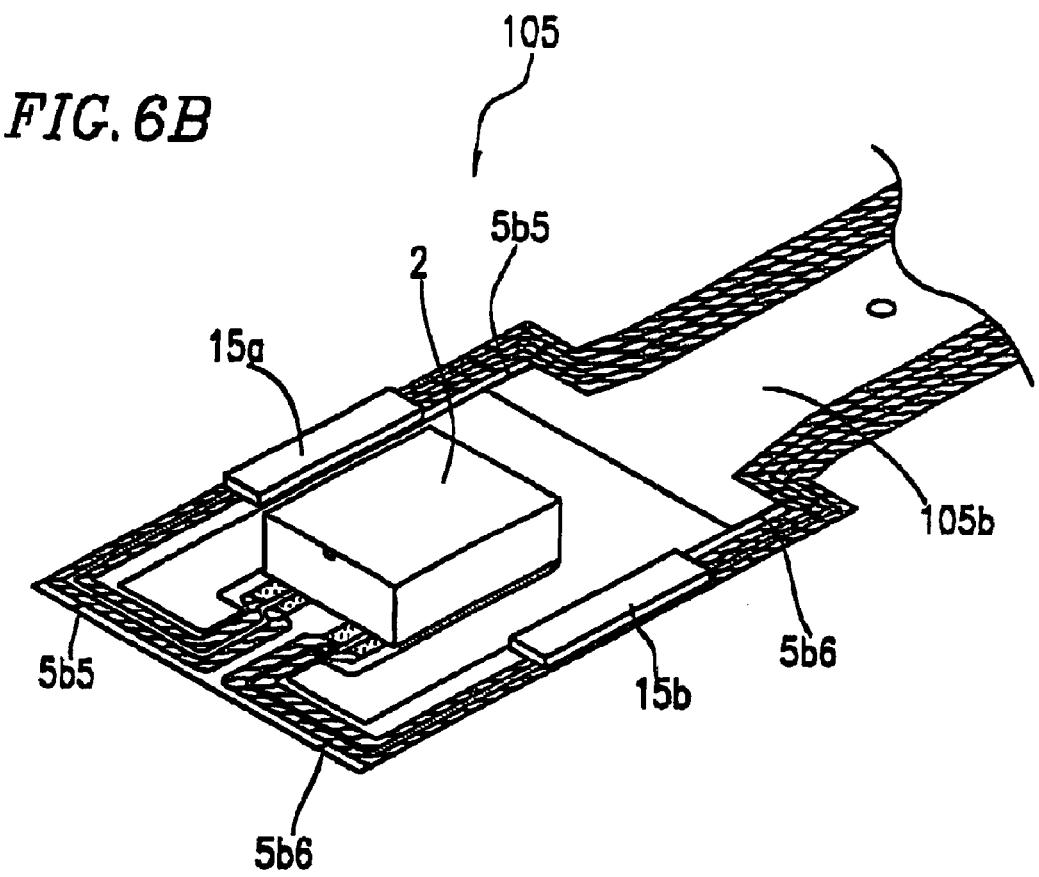

FIG. 7E
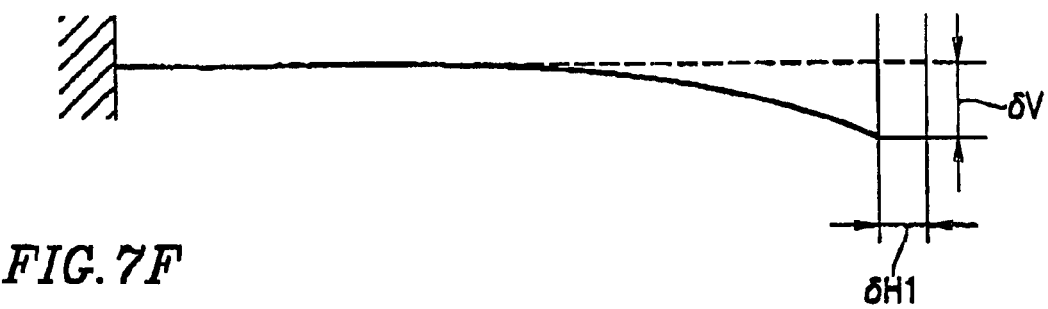
FIG. 7F
FIG. 7G
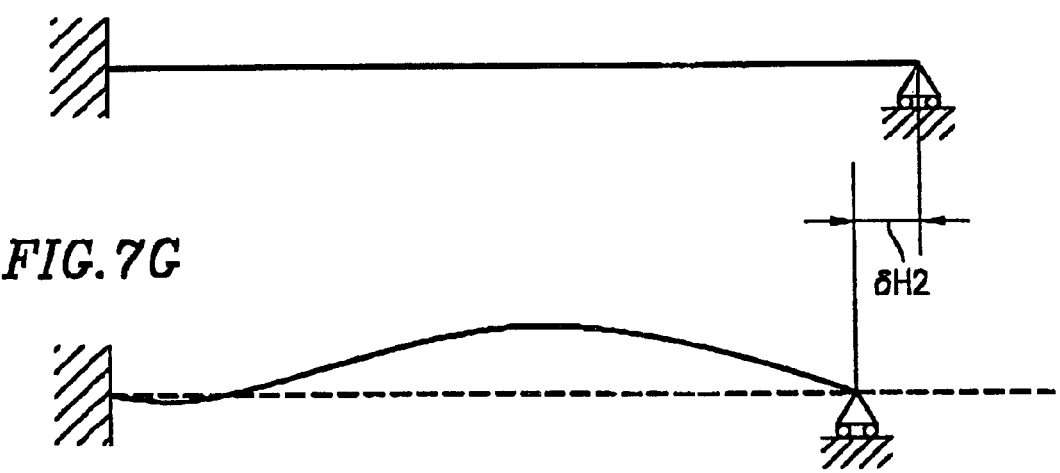

HEAD SUPPORT MECHANISM, INFORMATION RECORDING/REPRODUCING APPARATUS, AND METHOD OF MANUFACTURING HEAD SUPPORT MECHANISM

This application is a U.S. National Phase Application of PCT International Application PCT/JP99/05061.

TECHNICAL FIELD

The present invention relates to a head support mechanism, an information recording/reproducing apparatus incorporating the same, and a method of manufacturing the head support mechanism. More particularly, the present invention relates to a head support mechanism including a micro-movement driving means, and an information recording/reproducing apparatus incorporating the same, and a method of manufacturing the head support mechanism.

BACKGROUND ART

Magnetic disk apparatuses as information recording/reproducing apparatuses have been used as chief external memory devices for computers because of their large capacity, high transfer rates, and high-speed random access capabilities. In particular, there is a marked recent trend toward larger capacity magnetic disk apparatuses, the density being increased at an annual rate of 60%. Correspondingly, the size of bit cells recorded in a disk is decreased, leading to a need for even narrower tracks. For example, in order to achieve an areal recording density of 20 to 40 Gbits/in$^2$, a sub-micron track pitch of 0.35 μm or less is expected to be required. Precise and high-speed tracking control is being pursued for the stabilization of signals in recording and reproducing information on such narrow tracks.

A conventional magnetic disk apparatus typically has a head for recording and reproducing information on a disk medium, a slider carrying the head, a head support mechanism for supporting the head via the slider, and a driving means for causing the head to track to a predetermined position on the disk medium via the head support mechanism. In conventional disk apparatuses, the driving means is generally implemented as a single stage of a rotary VCM (voice coil motor).

Such a single-stage driving means imposes some limits to the realization of high-precision tracking for the above-described narrow track pitch on the order of sub-microns. Various techniques have been devised in which a second stage of a micro-movement driving means is used in addition to the first stage or the main driving means. As such a two-stage controlled actuator, a mode in which a head support mechanism (i.e., suspension) is driven, a mode in which a slider is driven, a mode in which a head element is mounted on a slider, and the like, have been devised.

The functions of a head support mechanism of a magnetic disk apparatus include pressuring a slider toward a disk against a force acting on the slider due to the proximity flying, or contact with, a rotating disk, causing the slider to track a waving disk surface, and the like. Accordingly, the head support mechanism is composed of a plurality of members so that these functions are assigned to the individual members. The member for serving the former function is referred to as a load beam. The member for serving the latter function is referred to as a flexure or gimbal (hereinafter referred to as a "flexure").

Japanese Laid-open Publication No. 9-73746 discloses a head support mechanism including micro-movement driving means such that first and second piezoelectric thin films are provided in parallel on one surface of a load beam in a longitudinal direction thereof, and third and fourth piezoelectric thin films are provided facing the opposite surface. However, in order to obtain a large displacement for enabling tracking in this structure, it is necessary to expand or contract (deform) the piezoelectric thin films against a substantial inplane rigidity, which requires a high driving voltage (e.g., 50 V) because the expansion and contraction directions (displacement direction) of the piezoelectric thin film are within the plane of the piezoelectric thin film.

Japan Society of Mechanical Engineers, the 75th Ordinary General Meeting Conventional Speech Papers (IV) (1998, March 31 to April 3, Tokyo), pp. 208–209 discloses a two-stage controlled actuated mounted on a back face of a slider. This amounts to a driving mode in which piezoelectric ceramics are employed as micro-movement driving means, and in which a multi-layer structure is adopted in order to reduce a driving voltage. A multi-layer structure including a multitude of layers is designed so as to reduce a driving voltage. In this case, too, the expansion and contraction directions (displacement direction) of the piezoelectric ceramics are within the plane of the piezoelectric ceramics multi-layer structure. Therefore, the piezoelectric ceramics need to be expanded or contracted (deformed) against a substantial inplane rigidity, which disadvantageously requires a considerably high applied driving voltage (e.g., 20 V), similar to the above-described conventional example disclosed in Japanese Laid-open Publication No. 9-73746. Since this two-stage controlled actuator is of a type which is mounted on the back face of a slider, a thickness of the magnetic disk apparatus in a height direction thereof is increased, which hinders the reduction in size and thickness of the magnetic disk apparatus.

An applied driving voltage of several tens of volts is required for the above-described conventional micro-movement driving means. Whereas a typical reproduction signal in a magnetic disk apparatus is generally on the order of millivolts, the driving voltage for the above-described conventional micro-movement driving means is on the order of several tens of volts. Therefore, some influence is expected on the reproduction signal due to the driving of the micro-movement driving means.

With the above-described conventional example, it may be difficult to obtain a large displacement for tracking along a tracking direction, or a high driving voltage may be required to obtain a large displacement, indicative of problems associated with a poor driving efficiency.

Furthermore, there are structural disadvantages in view of reduction in size and mass of the magnetic disk apparatus. The present invention was made in order to solve these conventional problems.

An objective of the present invention is to provide: a head support mechanism including micro-movement driving means which realizes high-speed and high-precision tracking so as to be compatible with narrow track pitches required due to an increasing areal recording density while the micro-movement driving means is easy to produce and is driven with a low driving voltage at a practical level; an information recording/reproducing apparatus incorporating the same; and a method of manufacturing the head support mechanism.

DISCLOSURE OF THE INVENTION

A head support mechanism according to the present invention is a head support mechanism comprising a head and a slider for carrying the head, the head being caused to track by main driving means, wherein: the head support mechanism further comprises driving sub-means comprising a thin film and causing the head to have a micro-movement; and the driving sub-means causes the head to have a micro-movement by utilizing flexural deformation of the thin film. As a result, the aforementioned objective of the present invention is accomplished.

The thin film may have a film thickness equal to or less than 10 μm.

The thin film may be formed on a base material and has a film thickness equal to or less than 10 μm; and the thin film may be formed on the base material by using a film growth process.

The film growth process may comprise a direct film growth process.

The film growth process may comprises a transcription process.

The thin film and the slider may be disposed along a tracking direction of the head.

An information recording/reproducing apparatus according to the present invention is an information recording/reproducing apparatus comprising: a head support mechanism having a head and a slider for carrying the head; main driving means for causing the head to track via the head support mechanism, so that information on a disk is recorded/reproduced by means of the head, wherein: the head support mechanism comprises driving sub-means comprising a thin film and causing the head to have a micro-movement; and the driving sub-means causes the head to have a micro-movement by utilizing flexural deformation of the thin film. As a result, the aforementioned objective of the present invention is accomplished.

The thin film may be formed so that the thickness direction substantially coincides with a tracking direction of the head.

The thin film may have a film thickness equal to or less than 10 μm.

A main portion of a member comprised by the driving sub-means may be disposed in a space within the thickness, from the disk surface, of the slider along a height direction.

The driving sub-means may be in the vicinity of a position along a height direction from the disk surface of a center of gravity of the slider.

The head support mechanism may include a plurality of thin plate spring portions formed substantially perpendicular to the disk surface.

The driving sub-means further may comprise a base material to function as an actuating plate; and the base material may comprise a spring material.

The driving sub-means may be of a piezoelectric type, electrostatic type, electromagnetic type, magnetostrictive type, or shape memory alloy type.

The driving sub-means may comprise a piezoelectric material, electrostrictive material, or magnetostrictive material.

The head support mechanism may comprise: a first member coupled to the slider; and a second member coupled to the main driving means, wherein the driving sub-means may be formed on the first member.

The first member may comprise a flexure for causing the slider to follow the disk surface.

The first member may further comprise a thin metal plate; the thin metal plate includes a bent portion which is formed by bending; and the driving sub-means may be formed on the bent portion.

The bent portion may be bent in a direction which is substantially perpendicular to the disk surface; and the bent portion may include a grooved portion for enhancing the processing precision of the bending.

The bent portion may be formed so that its bent height dimension is smaller than a dimension of the slider along a first direction which is a rotation axis direction of the disk; and a dimension of the driving sub-means along the first direction may be smaller than the dimension of the slider along the first direction.

The head support mechanism may further comprise a driving sub-means formation member on which the driving sub-means is formed; and recording/reproducing signal wiring coupled to the head may be formed on the driving sub-means formation member.

The head support mechanism may include a plurality of parallel spring portions formed substantially perpendicular to the disk surface; the driving sub-means may be formed on the plurality of parallel spring portions; and the driving sub-means may translates the head along a tracking direction.

The head support mechanism may include a plurality of plate spring portions disposed in a radial arrangement from a rotation center; the driving sub-means may be formed on the plurality of plate spring portions; and the driving sub-means may rotate the slider around the rotation center, and cause the head to have a micro-movement along a tracking direction.

The plurality of plate spring portions may comprise a plate spring portion having a longitudinal direction along the tracking direction.

The plurality of plate spring portions may comprise a plate spring portion having a longitudinal direction along a direction substantially perpendicular to the tracking direction.

The head support mechanism may comprise a pair of driving sub-means.

The driving sub-means may be located so as to be substantially parallel to a direction in which the slider is disposed.

The driving sub-means may be disposed in such a manner that extensions of directions in which the driving sub-means are disposed constitute predetermined angles with respect to an extension of a direction in which the slider is disposed, so as to intersect at a leading end of the head support mechanism.

The driving sub-means may constitute an angle equal to or greater than 15° with a plane perpendicular to disk surface.

The head support mechanism may further comprise a first member coupled to the slider; the driving sub-means may be formed on the first member; and the driving sub-means may be disposed in such a manner that a center of gravity of the first member is located in the vicinity of an intersection between extensions of directions in which the driving sub-means are disposed.

The head support mechanism may comprise two or more pairs of driving sub-means.

The driving sub-means may be formed by using a semiconductor process.

The driving sub-means may comprise restraint alleviation means for restraining at least a portion of the thin film.

The restraint alleviation means may comprise means for weakening the rigidity of the driving sub-means.

The restraint alleviation means may comprise a spring structure.

The restraint alleviation means may comprise a low rigidity material.

The restraint alleviation means may comprise wiring for applying to the thin film a driving voltage for driving the thin film.

The information recording/reproducing apparatus may further comprise control means for controlling the main driving means and the driving sub-means.

The thin film may be formed on a base material; and the thin film may be formed on the base material by using a film growth process.

The film growth process may comprise a direct film growth process.

The thin film may comprise a metal film, an underlying layer, a thin film piezoelectric, and a metal electrode film, which are sequentially layered on the base material.

The thin film may comprise an insulation film, a metal film, an underlying layer, a thin film piezoelectric, and a metal electrode film, which are sequentially layered on the base material.

The thin film may comprise a metal film, an underlying layer, a thin film piezoelectric, and a metal electrode film, which are sequentially layered on the base material in a vacuum chamber.

The thin film may comprise an insulation film, a metal film, an underlying layer, a thin film piezoelectric, and a metal electrode film, which are sequentially layered on the base material in a vacuum chamber.

The thin film may comprise a metal film; and the metal film may be formed by either a vacuum process or a process in a liquid.

The film growth process may comprises a transcription process.

The thin film may be formed of a multilayer film having a metal film, a thin film piezoelectric, an underlying layer, and a metal electrode film, adhered on the base material.

The thin film and the slider may be disposed along a tracking direction of the head.

The thin film may be formed on the base material in such a manner that the thickness direction substantially coincides with a tracking direction of the head.

The thin film may be formed on the base material in such a manner that the thickness direction is substantially perpendicular to the disk surface.

The base material may be elastic; and the base material may have a thickness such that a flexural rigidity required for allowing the slider to follow the waving disk surface and a displacement required for tracking are both obtained.

The thickness of the base material may be equal to or greater than 0.5 µm and equal to or less than 50 µm.

The base material may be formed of stainless steel.

The base material may be formed of silicon.

The thin film may comprise a thin film piezoelectric; and the thin film piezoelectric may be formed by an rf sputtering method, an ion beam sputtering method, a sol-gel method, a CVD method, or a laser ablation method.

The thin film piezoelectric may comprise a PZT film.

The thin film piezoelectric may comprise a ZnO film.

The thin film piezoelectric may comprise a PVDF film.

The thin film may be formed on both sides of the base material so as to interpose the base material therebetween.

The thin film may comprise a thin film piezoelectric; and the thin film piezoelectric may be entirely covered by an insulation film, The insulation film may comprise a material whose main component is polyimide, an SAM film, an LB film, or a nitride.

The thin film may comprise a pair of thin films; the pair of thin films may be disposed substantially parallel to the disk surface; and voltages having reverse phases may be applied to the thin film provided on one side of the head and the thin film provided on the other side of the head so that the thin films warp in opposite directions.

The thin film may comprise a pair of thin films;

the pair of thin films are disposed substantially parallel to the disk surface; and voltages having the same phase may be applied to the thin film provided on one side of the head and the thin film provided on the other side of the head so that the thin films warp in the same direction.

The thin film may comprise an underlying layer.

The underlying layer may comprise a PT layer, a PLT layer, a PBTiO3 layer, an SrTiO3 layer, or a HaTiO3 layer.

The PLT layer may contain substantially no Zr.

The thin film may comprise a metal film which is layered adjacent to the underlying layer; and the metal film may comprise either a platinum film or a titanium film.

The base material may include wiring for applying a voltage to the thin film.

The wiring may be formed after the thin film is formed on the base material.

A method for manufacturing a head support mechanism is a method for manufacturing a head support mechanism comprising a head and a slider for carrying the head, the head being caused to track by main driving means, wherein: the head support mechanism further comprises driving sub-means comprising a thin film and causing the head to have a micro-movement; the driving sub-means causes the head to have a micro-movement by utilizing flexural deformation of the thin film; the thin film is formed on a base material; and the thin film is formed on the base material by using a film growth process, comprising: a first step of forming the thin film on the base material by using a film growth process; and a second step of attaching the slider carrying the head onto the base material. As a result, the aforementioned objective of the present invention is accomplished.

The first step may comprise a third step of forming the thin film on the base material by using a direct film growth process.

The third step may comprise a fourth step of sequentially layering a metal film, an underlying layer, a thin film piezoelectric, and a metal electrode film on the base material.

The third step may comprise a fourth step of sequentially layering an insulation film, a metal film, an underlying layer, a thin film piezoelectric, and a metal electrode film on the base material.

The thin film may comprise a metal film; and the third step may comprise a fourth step of forming the metal film by either a vacuum process or a process in a liquid.

The first step may comprise a third step of forming the thin film on the base material by using a transcription process.

The third step may comprise: a fourth step of sequentially layering a metal film, an underlying layer, a thin film piezoelectric, and a metal electrode film on a transcription substrate; a fifth step of adhering the base material to a layering surface of the transcription substrate; and a sixth step of removing the transcription substrate from the metal film.

The transcription substrate may be formed of MgO, sapphire, strontium titanate, or silicon.

The base material may be formed of silicon.

The thin film may comprise a thin film piezoelectric; the first step may comprise a third step of forming the thin film piezoelectric by an rf sputtering method, an ion beam sputtering method, a sol-gel method, a CVD method, or a laser ablation method.

The first step may comprise a third step of forming the thin film on both sides of the base material so as to interpose the base material therebetween.

The thin film may comprise a thin film piezoelectric; and the first step may comprise a third step of forming the thin film piezoelectric.

The thin film piezoelectric may comprise a PZT film.

The thin film piezoelectric may comprise a ZnO film.

The thin film piezoelectric may comprise a PVDF film.

The thin film may comprise a thin film piezoelectric; and the first step may comprise a third step of entirely covering the thin film piezoelectric with an insulation film.

The insulation film may comprise a material whose main component is of polyimide, an SAM film, an LB film, or nitride.

The first step may comprise a third step of forming the thin film on both sides of a position at which the head is attached with respect to tracking direction of the head.

The thin film may comprise an underlying layer; and the first step comprises a third step of forming the underlying layer.

The underlying layer may comprise a PT layer, a PLT layer, a PBTiO3 layer, an SrTiO3 layer, or a BaTiO3 layer.

The PLT layer may contain substantially no Zr.

The first step may comprise a fourth step of forming a metal film which is layered adjacent to the underlying layer; and the metal film may comprise either a platinum film or a titanium film.

The method for manufacturing a head support mechanism may further comprise, after the thin film is formed on the base material, a third step of forming wiring on the base material for applying a voltage to the thin film.

BRIEF DESCRIPTION OF THE DRAWINGS

FIG. 6B is a partially-enlarged perspective view illustrating a structure according to Embodiment 1.

FIG. 7E to FIG. 7G are diagrams illustrating flexural deformation of a thin film.

BEST MODE FOR CARRYING OUT THE INVENTION (Embodiment 1)

Figure 1:
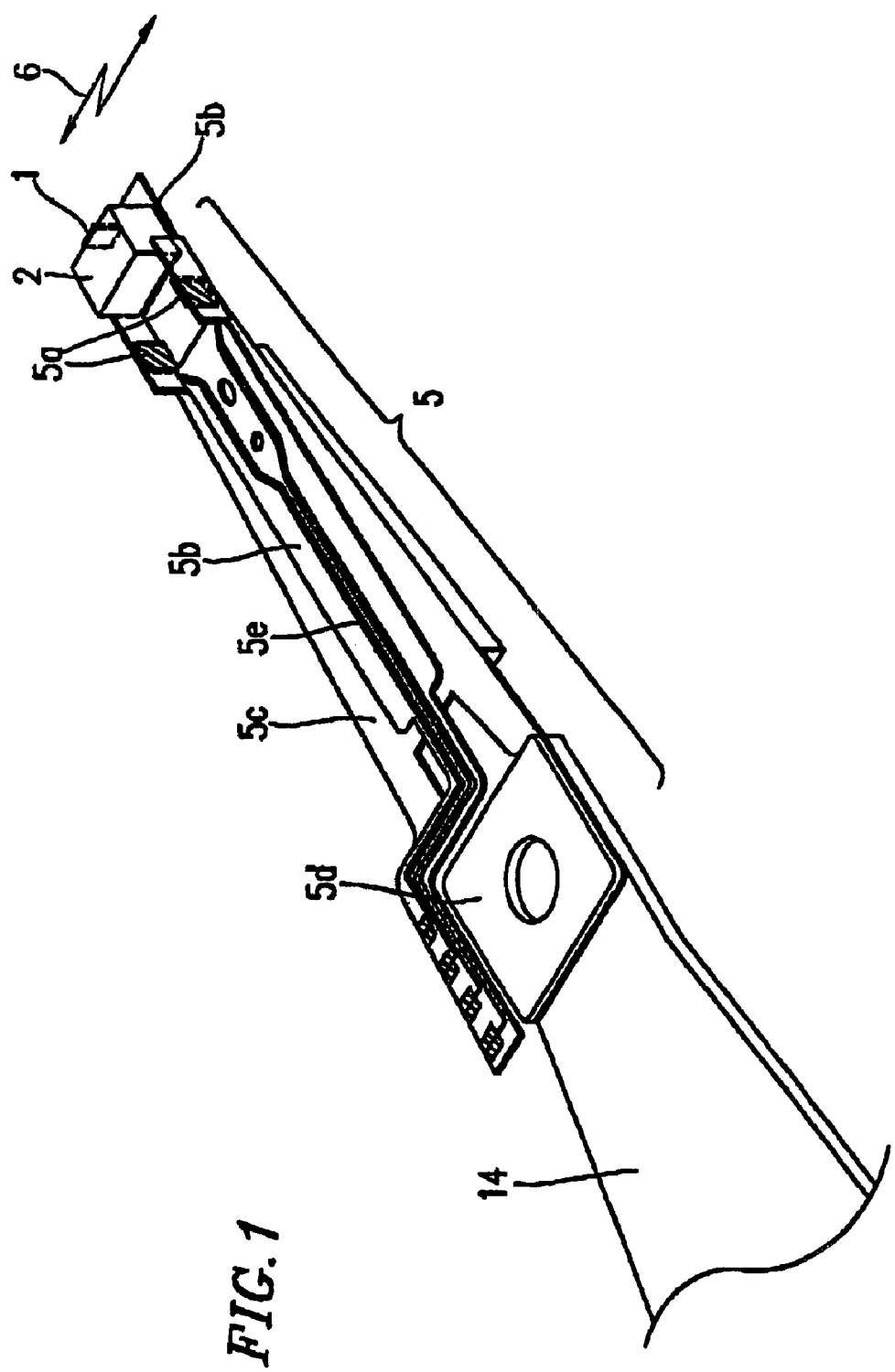
FIG. 1 is a perspective view showing a head support mechanism according to Embodiment 1 of the present invention.
Figure 2:
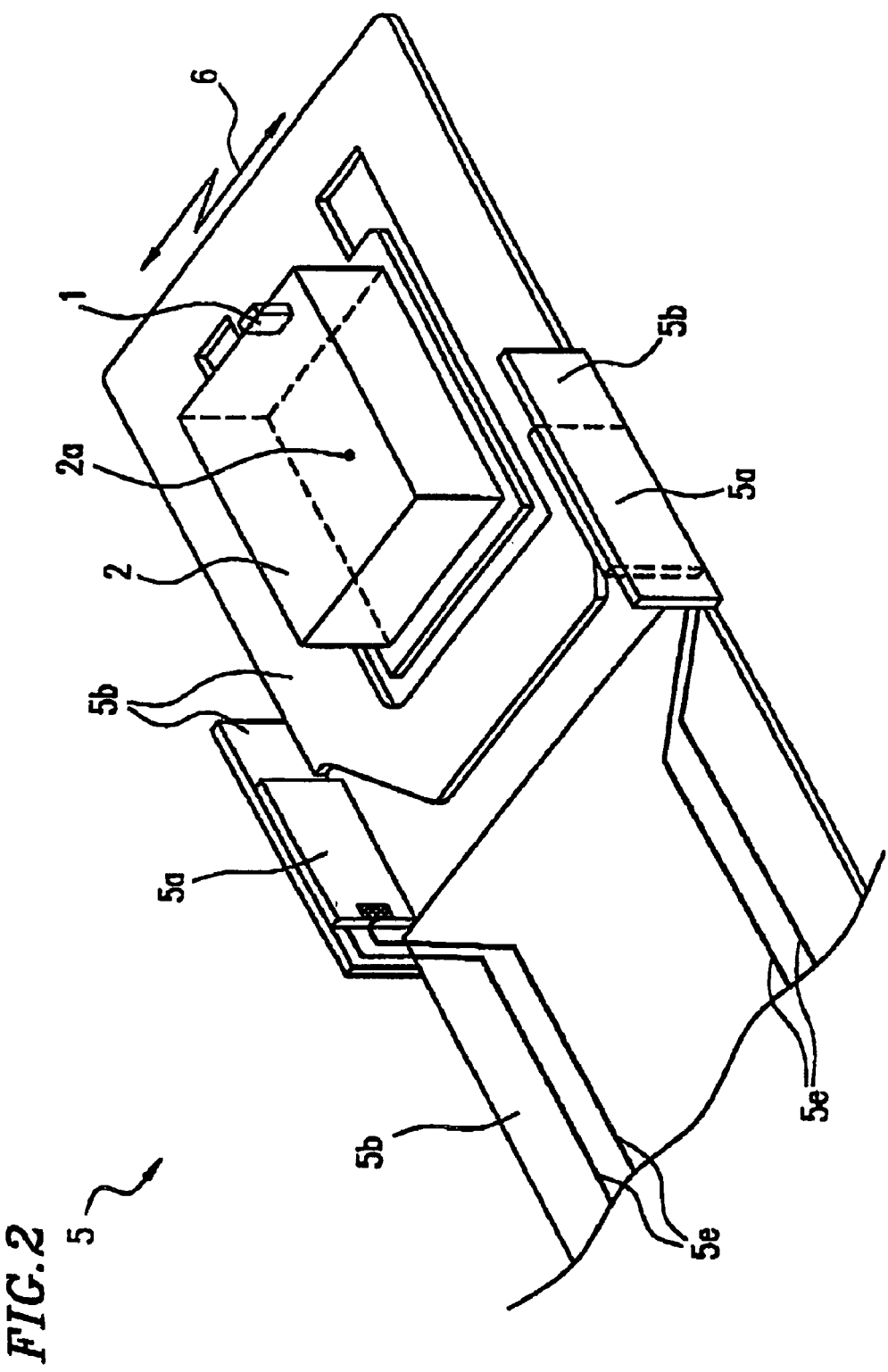
FIG. 2 is a partially-enlarged perspective view showing a head support mechanism according to Embodiment 1 of the present invention.

FIG. 1 is a perspective view showing a head support mechanism according to Embodiment 1 of the present invention. FIG. 2 is a partially-enlarged perspective view showing the head support mechanism according to Embodiment 1 of the present invention.

Both of these figures are perspective views showing the head support mechanism as viewed from a disk surface.

Figure 3:
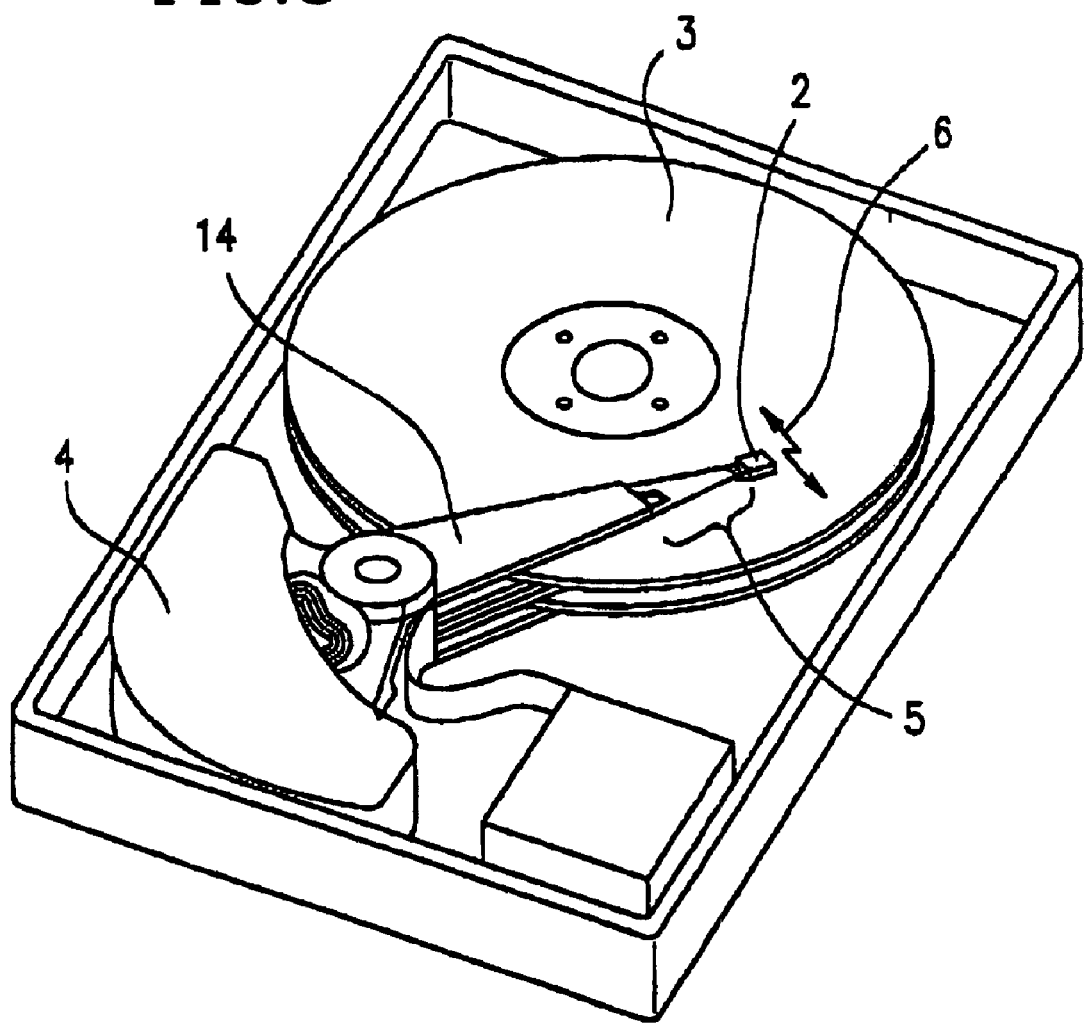
FIG. 3 is a diagram showing a magnetic disk apparatus incorporating a head support mechanism according to the present invention.
Figure 4:
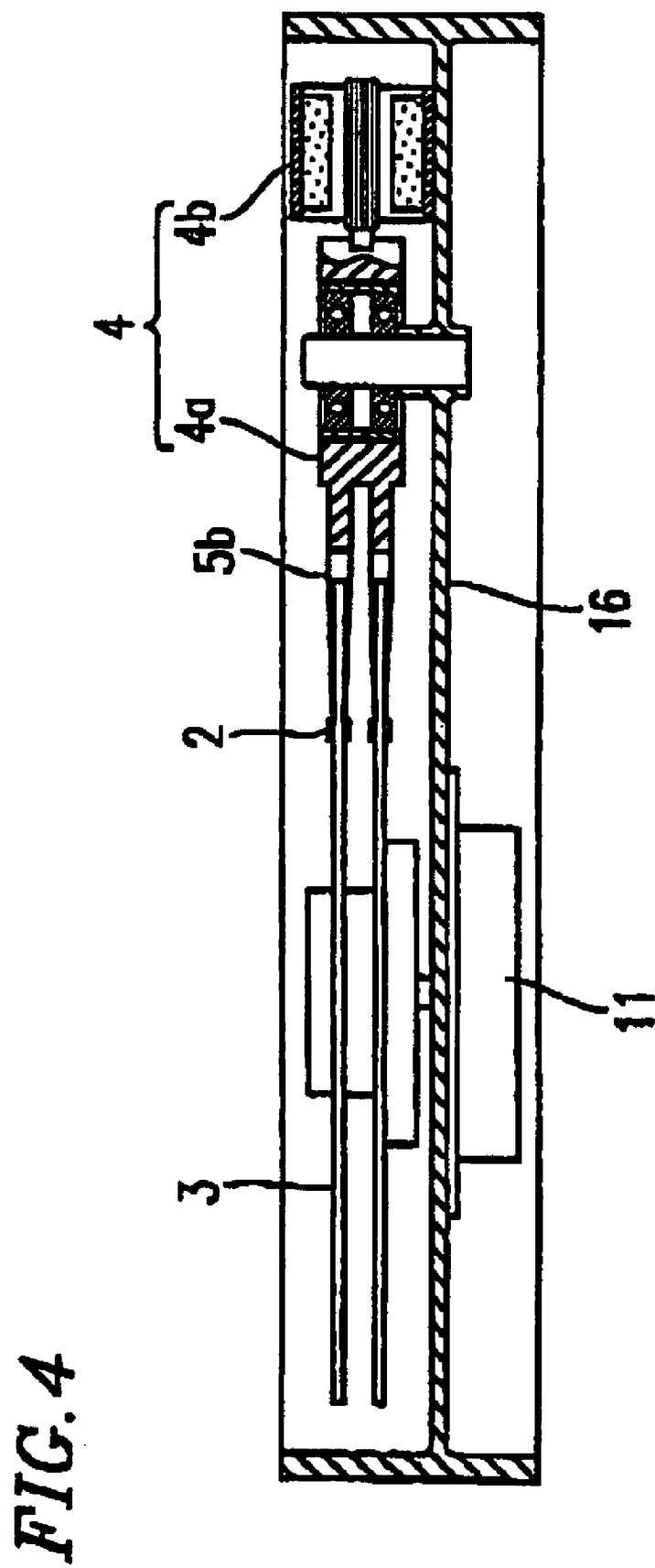
FIG. 4 is a vertical cross-sectional view of a main portion of a magnetic disk apparatus according to Embodiment 1 of the present invention.

FIG. 3 is a perspective view showing a magnetic disk apparatus incorporating the head support mechanism according to the present invention. FIG. 4 is a vertical cross-sectional view showing a main part of the magnetic disk apparatus incorporating the head support mechanism according to the present invention.

In FIGS. 1 to 4, reference numeral 1 denotes a head for recording and reproducing information; 2 denotes a slider carrying the head; 3 denotes a disk which is rotated by a motor and on which information is recorded or reproduced; 4 denotes a main driving means for causing the head to track; 4a denotes an arm constituting a portion of the main driving means; 5 denotes a head support mechanism; and 6 denotes a tracking direction.

Reference numeral 11 denotes a spindle motor for rotating the magnetic disk 3, which is preferably a DC brushless motor because of its high rotation precision and reliability. Reference numeral 4 denotes the main driving means for moving a flexure 5b along a radial direction on the magnetic disk surface so as to position the magnetic head 1 at a target track position. The flexure 5b, which is attached to a flexure 5c, is fixed to an arm 14 via a fixing member 5d. A head actuator 4a, which is rotatably supported on a chassic body 16 of the magnetic disk apparatus via a pivot bearing incorporating a ball bearing or the like, is rotated by a voice coil motor 4b. The voice coil motor 4b is controlled by a driving control apparatus (not shown). The material of the head actuator 4a is preferably an aluminum alloy which is light-weight and expected to be highly rigid. The voice coil motor 4b is composed of a coil portion and a magnet portion opposed to the coil portion with an appropriate interspace therebetween. The coil portion is composed of polyurethane copper wire. The magnet portion, which is fixed on the chassis 16, is composed of multilayers of a metal magnet material having a high level of coercive force (e.g., rare earth metal) provided on an iron plate serving as a yoke. A single magnetic disk apparatus typically includes plural sets of the magnetic disk 3, the slider 2, and the flexure 5b for an increased storage capacity, as shown in FIG. 4.

In FIG. 1, the head support mechanism 5 further includes two major members: the flexure 5b having micro-movement driving sub-means 5a, which are separate from the main driving means 4, and having an appropriate flexural rigidity for allowing the slider 2 to follow a waving surface of the disk 3; and the load beam 5c for pressing the slider 2 toward the surface of the disk 3 with an appropriate force.

Note that in FIG. 1, which is a perspective view as seen from the disk surface, a position at which the load beam 5c applies a load on a slider 2 is hidden from view. However, the load beam 5c abuts with the slider 2 substantially at the center of gravity of the slider 2.

Reference numeral 5d denotes a fixing member for coupling the head support mechanism with the arm 4a composing the main driving means. It is possible to omit 5d so that the load beam 5c is directly coupled to the arm 4a. Wiring 5e used for driving the micro-movement driving sub-means 5e is provided on the flexure 5b. Although not shown, wiring for coupling recording/reproduction signals in the head may similarly be provided on the flexure 5b.

FIG. 2 shows a tip portion of the flexure 5b composing the head support mechanism 5. The micro-movement driving sub-means 5a are composed of thin films or sheet-like piezoelectric members. By applying a voltage to a plurality of electrodes (not shown) provided on both sides of each piezoelectric member, the piezoelectric members are warped along a thickness direction due to a unimorph type piezoelectric actuation function composed of the flexure base material and the piezoelectric members, so as to be movable along the tracking direction 6.

According to the present embodiment, in order to realize an ideal translation mechanism so that the locus of the slider movement becomes parallel, a pair of micro-movement driving sub-means 5a are provided, thereby obtaining a thin parallel-pulse spring structure. By utilizing the warping of the piezoelectric members along the thickness direction thereof as driving means, it is possible to obtain a large displacement required for tracking through low voltage driving. By constructing the main portions of the micro-movement driving sub-means 5a so as to fit in a space within the thickness, from the disk surface, of the slider 2 (along a height direction), an increase in the thickness of the disk apparatus is prevented. As a result, the size and thickness of the disk apparatus can be reduced. In accordance with this structure, the height of the center 2a of gravity of the slider 2 from the disk surface and the height of the micro-movement driving sub-means 5a becomes substantially the same. As a result, an unwanted bending moment associated with driving can be prevented from occurring in the slider.

The base material for the flexure 5b may be any thin plate material having elasticity. However, it is desirable to employ a thin metal plate, e.g., a stainless steel sheet having a thickness of 0.5 μm to 50 μm, with a thin film piezoelectric member having a thickness of 10 μm or less (e.g., PZT, PLT, or PLZT) and electrodes formed thereon, whereby an appropriate flexural rigidity, which is required for the flexure, and a driving efficiency for obtaining a large displacement through low voltage driving, which is required for tracking, can be reconciled.

For example, a unimorph type actuator featuring a cantilever having a width 0.25 μm and a length of 1 mm made of 25 μm-thick stainless steel with a 3 μm-thick PZT thin film piezoelectric member and electrodes formed thereon can provide a displacement on the order of 1 μm through low voltage driving between −3 V to +3 V.

The disclosed conventional driving mechanism already described in the prior art section cannot achieve a displacement on the order of 1 μm through such a low voltage driving. Although the present embodiment adopts a unimorph type micro-movement driving sub-means format, a bimorph type driving sub-means may be composed by constructing thin film piezoelectric members on the other side of the flexure as well. In this case, there is an advantage in that an even larger displacement can be obtained with the same driving voltage, but there is also a disadvantage of complicated construction.

By employing a thin metal plate for the base material composing the flexure, there is provided a significant manufacturing advantage in that a head support mechanism structure including the driving sub-means shown in FIGS. 1 or 2 can be easily produced by bending a thin metal plate.

Thus, according to Embodiment 1 of the present invention, there can be provided a head support mechanism including micro-movement driving means which realizes high-speed and high-precision tracking so as to be compatible with narrow track pitches required due to an increasing areal recording density while the micro-movement driving means is easy to produce at a practical level, as well as a magnetic disk apparatus incorporating the same.

Figure 5:
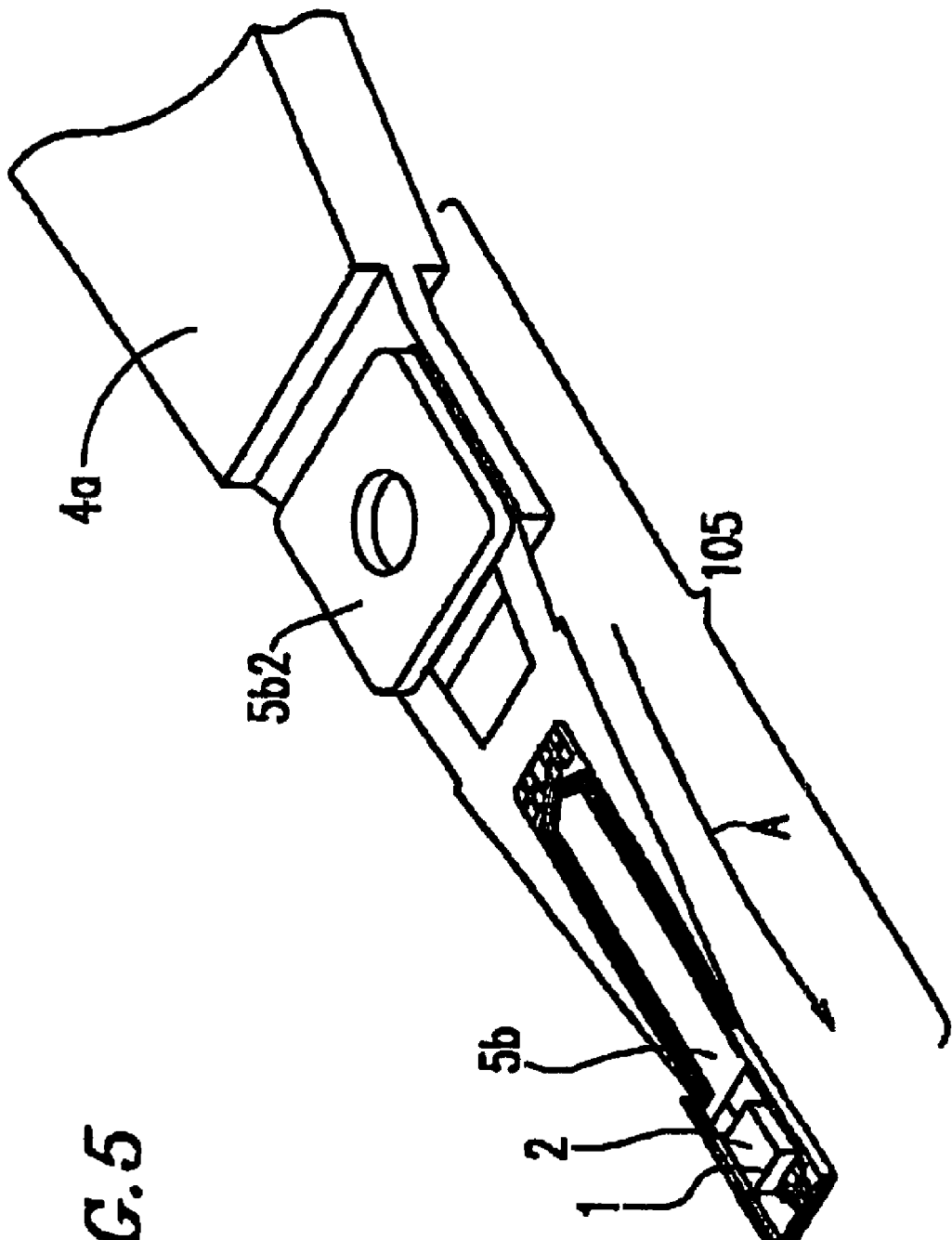
FIG. 5 is a partially-enlarged perspective view showing the neighborhood of a slider support member according to Embodiment 1.
Figure 6A:
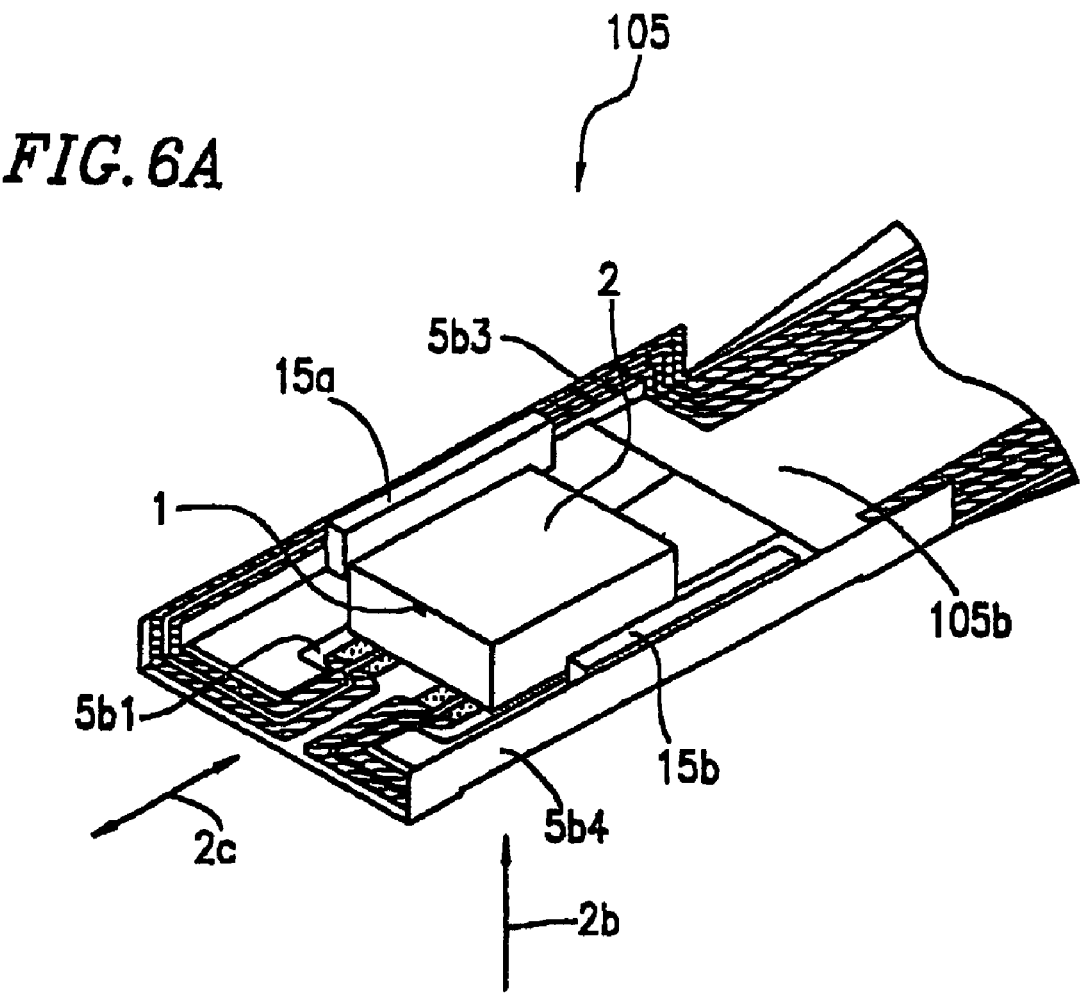
FIG. 6A is partially-enlarged perspective view showing a slider support member according to Embodiment 1.

Referring to FIGS. 5, 6A, and 6B, a variant of the head support mechanism according to Embodiment 1 is described. Component members which are identical to those of the head support mechanism 5 are denoted by the same reference numerals. Detailed description of such members is omitted.

Reference numeral 1 denotes a magnetic head for recording or reproducing data in a certain track on a magnetic disk 3; 2 denotes a slider carrying the magnetic head 1; 5b denotes a flexure which elastically supports the slider 2 while tolerating changes in the posture thereof, with a gimbal portion 5b1 for affixing the slider 2 being provided at one end. The affixing of the slider 2 can properly be achieved by adhesion. The flexure 5b is preferably composed of a thin stainless steel plate for plate springs so as to be able to easily and accurately generate a very small elastic biasing force of several grams. A wiring pattern for transmitting electrical signals is formed on the flexure 5b. Since the increase in recording density will promote downsizing of the magnetic head 1 and the slider 2, it is considered that wiring patterns will be commonly used in future, instead of lead wires.

Reference numerals 15a and 15b denote a pair of driving sub-means which are provided in the vicinity of both sides of the slider 2 with respect to a radial direction on the magnetic disk surface, the pair of driving sub-means being affixed to the flexure 5b. The driving sub-means 15a and 15b are affixed to a pair of driving sub-means attachment portions 5b3 and 5b4 which are bent substantially at a right angle in the vicinity of both sides of the gimbal portion 5b1. As shown in FIG. 6A, the pair of driving sub-means attachment portions 5b3 and 5b4 are bent toward the side on which to attach the slider 2 to the gimbal portion 5b1, with a bent height which is smaller than a dimension ("slider thickness dimension") of the slider 2 along a rotation axis direction of the magnetic disk (i.e., the direction on an arrow 2b). The dimension of the driving sub-means 15a and 15b along a rotation axis direction of the magnetic disk is smaller than the dimension of the slider 2 (slider thickness dimension) along that direction. In other words, the bent height dimension h4 of the driving sub-means attachment portions, the slider thickness dimension h3, the dimension h7 of the driving sub-means along the rotation axis direction of the magnetic disk, and an amount of change Δh in the posture of the slider 2 along the rotation axis direction of the magnetic disk are at positions satisfying the relationship represented by formulae 1 and 2:

$$h4 < h3 + \Delta h \quad \text{[formula 1]}$$

$$h7 < h3 + \Delta h \quad \text{[formula 2]}$$

The reason for the bend toward the side on which the slider 2 is attached to the gimbal portion 5b1 is in order to prevent the wiring pattern formed on the flexure 5b from being damaged due to the bending, and to increase the mounting density with which the dispose component members in a narrow space between magnetic disks as shown in FIG. 4.

The affixing of the driving sub-means 15a and 15b is preferably achieved via adhesion, film growth, or the like. In the present embodiment, the driving sub-means 15a and 15b are disposed so as to be parallel to a direction in which the slider 2 is disposed (i.e., the direction of an arrow 2C).

As shown in FIG. 6B, in terms of assembly precision and streamlining of the step number, it is preferably to adopt a method which involves affixing the driving sub-means 15a and 15b to the flexure 5b position before being subjected to a previous bending, followed by substantially perpendicularly bending, because this would enable the affixation of the positions of the driving sub-means 15a and 15b through the same step that affixes the positions of the slider 2 with an improved attachment accuracy. To this end, an even higher processing accuracy can be obtained by providing grooved positions 5b5 and 5b6 for improving processing accuracy at the bent portions at which the flexure 5b is substantially perpendicularly bent, as shown in FIG. 6B.

The operation of the magnetic disk apparatus will be described further with reference to FIGS. 7A to 7C. First, owing to the action of an air flow generated by the magnetic disk 3 which is rotated by the spindle motor 11 in a direction of A1 as shown, the slider 2 is caused to stably float at a predetermined height from the magnetic disk surface. The flexure 5b tolerates various changes in the posture of the slider 2 and allows a stable floating state to be maintained. In this state, the main driving means 4 causes the magnetic head 1 to track so as to be positioned at a target track position. Furthermore, the track position data in that state is fed back by the magnetic head 1 to a driving control apparatus (not shown), whereby the minute adjustment of the movement of the magnetic head 1 as caused by the main driving means 4 is handled by the driving sub-means 15a and 15b.

The driving principles of the head support mechanism according to the present invention will be described. FIG. 7A is a plan view of a head support mechanism 105 prior to the application of a driving voltage. FIGS. 7B and 7C are plan views of the head support mechanism 105 after the application of a driving voltage. FIG. 7D is a perspective view of the head support mechanism 105 after the application of a driving voltage. FIGS. 7E to 7G are diagrams illustrating flexural deformation of a thin film. Elements which are identical to those of the head support mechanism described with reference to FIG. 6A are denoted by the same reference numerals. Detailed description of such members is omitted.

With references to FIGS. 7E to 7G, the flexural deformation of a thin film will be described. FIG. 7E illustrates the warping of a thin film in a model in which one end is stabilized while the other end is left free. FIGS. 7F and 7G illustrate the warping of a thin film in a model in which one end is stabilized while the other end is simply supported. The head support mechanism according to the present invention includes driving sub-means which is composed of a thin film for causing micro-movement of a head, where the driving sub-means causes the micro-movement of the head by utilizing the flexural deformation of the thin film.

In FIG. 7E, the flexural deformation of the thin film includes a warp $\delta V$ along a direction substantially perpendicular to the longitudinal direction of the thin film, as well as a warp $\delta H1$ along a direction substantially parallel to the longitudinal direction of the thin film in a model in which one end is stabilized while the other end is left free.

In FIGS. 7F and 7G, the flexural deformation of the thin film further includes a warp $\delta H2$ along a direction substantially parallel to the longitudinal direction of the thin film in a model in which one end is stabilized while the other end is simply supported.

Figure 7A:
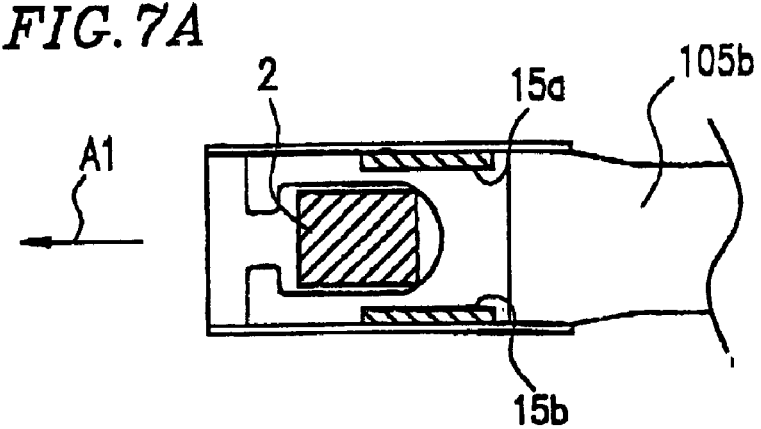
FIG. 7A is a partially-enlarged plan view illustrating the operation according to Embodiment 1.

FIG. 7A illustrates a state in which, in the absence of a driving voltage applied to the driving sub-means 15a and 15b, the driving sub-means 15a and 15b do not expand or shrink, so that the head 1 does not undergo micro-movement.

Figure 7B:
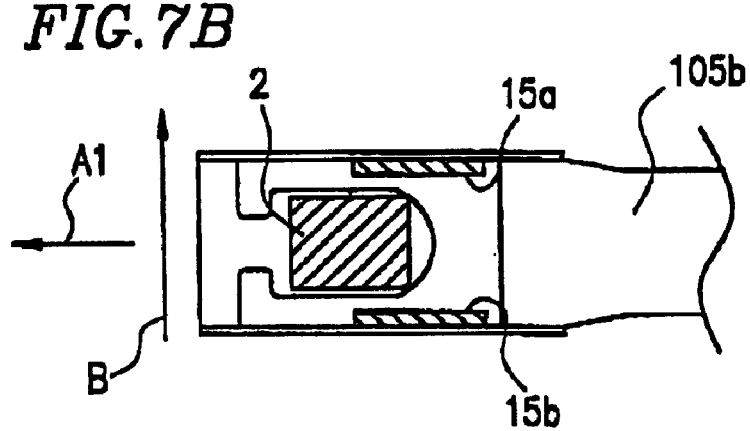
FIG. 7B is a partially-enlarged plan view illustrating the operation according to Embodiment 1.
Figure 7C:
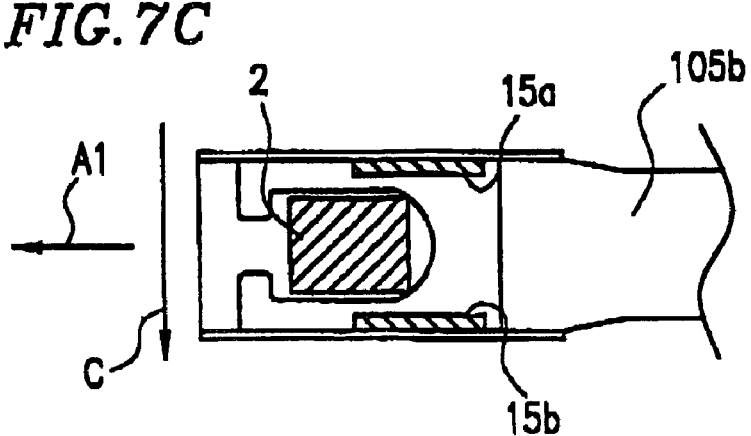
FIG. 7C is a partially-enlarged plan view illustrating the operation according to Embodiment 1.
Figure 7D:
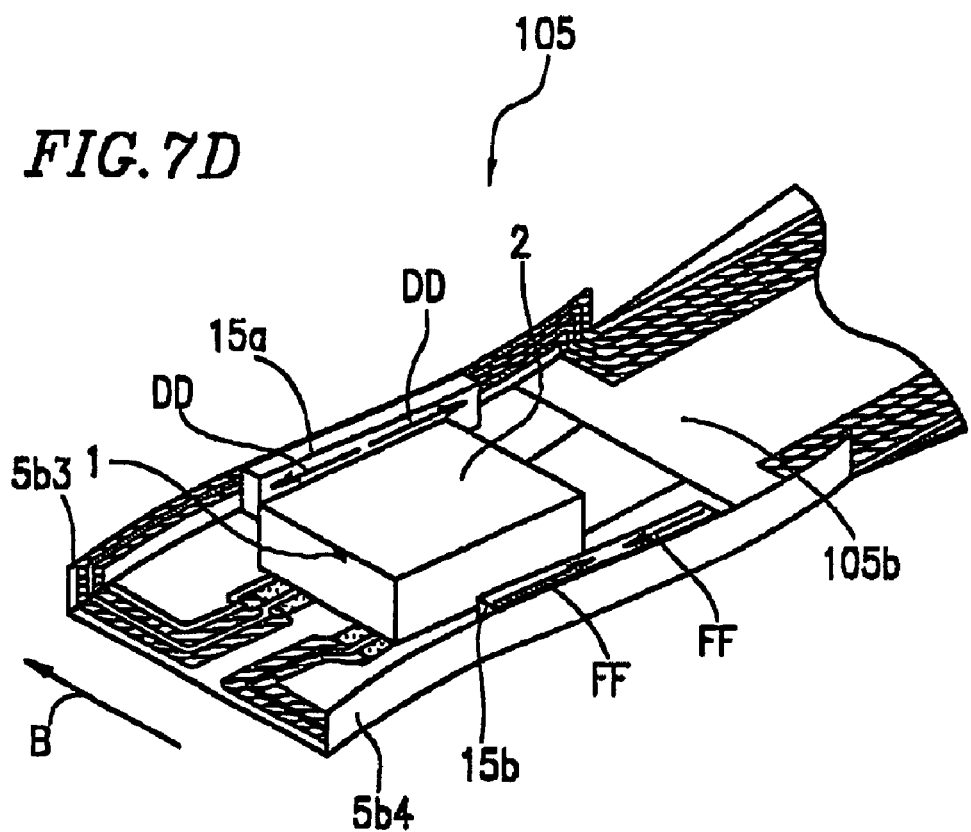
FIG. 7D is a perspective view showing a head support mechanism 105 after the application of a driving voltage.

Referring to FIGS. 7B and 7D, an example will be described in which a driving voltage is applied to each of driving sub-means 15a and 15b so that the driving sub-means 15a expands along the direction of an arrow DD and that the driving sub-means 15b shrinks along the direction of an arrow FF. As a result of the expansion of the driving sub-means 15a, a bent portion 5b3 warps in the direction of an arrow B. As a result of the compression of the driving sub-means 15b, a bent portion 5b4 also warps in the direction of the arrow B, as does the bent portion 5b3. Consequently, the leading end of the flexure 105b is translated in the direction of the arrow B. As a result, the slider 2 and the head on the flexure 105b are translated in the direction of the arrow B.

With the reference to FIG. 7C, where the plus and minus of the driving voltages which are applied to the driving sub-means 15a and 15b are reversed, the driving sub-means 15a shrinks and the driving sub-means 15b expand, in contrast to the example illustrated in FIGS. 7E and 7D. As a result, the slider 2 and the head are translated in the direction of an arrow C, as shown in FIG. 7C.

Thus, according to Embodiment 1, a very simple component structure utilizing sheet metal processing of a flexure on which a wiring pattern is formed, and the mounting density of component members can be improved in a narrow structural space between magnetic disks. In addition to using the main driving means, a further micro-movement adjustment of the magnetic head which has been moved can instantaneously be made in the close vicinity of the magnetic head. Thus, a stable and fast on-track control of the magnetic head can be achieved with narrow track pitches on the sub-micron order.

(Embodiment 2)

Figure 8:
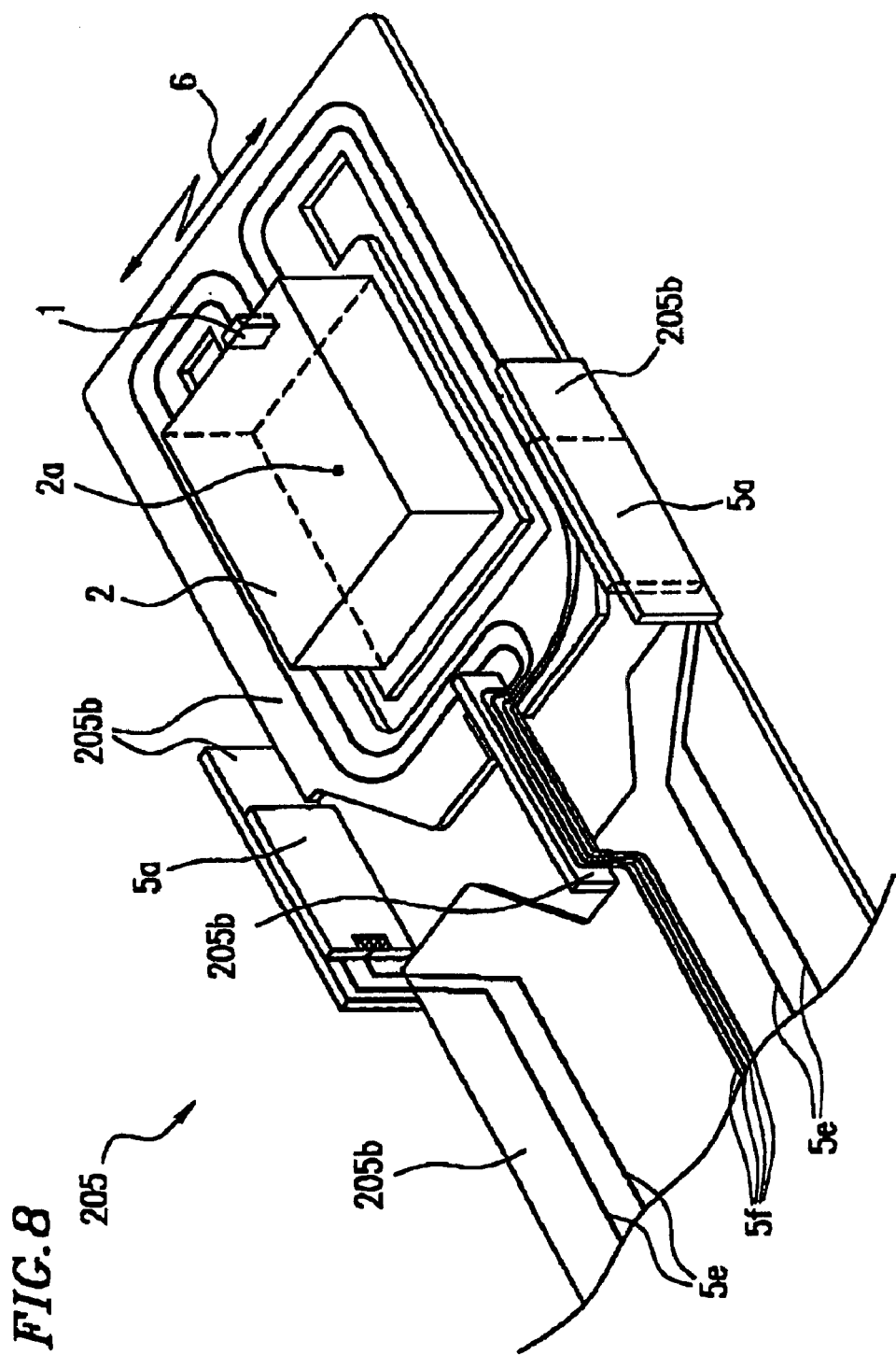
FIG. 8 is a partially-enlarged perspective view showing a head support mechanism according to Embodiment 2.

FIG. 8 is a partially-enlarged perspective view of a head support mechanism 205 according to Embodiment 2 of the present invention. Most of component members and the reference numerals thereof are the same as those described in Embodiment 1 above, and the detailed description of the same contents will not be repeated. A flexure 205b in the head support mechanism according to Embodiment 2 features a structure having three parallel thin plates, as opposed to the structure of Embodiment 1 in which two parallel thin plate springs are present.

On two of the three parallel thin plate springs, micro-movement driving sub-means 5a for the head is provided, similarly to Embodiment 1. However, on the other thin plate spring, recording/reproduction signal wiring 5f for loading recording/reproduction signals in the head 1 to the exterior is provided. By thus dedicating some of a plurality of thin plate springs to signal wiring only, it is possible to prevent deterioration in the recording/reproduction signals due to cross-talk with the wiring for driving purposes. There is also an advantage in that it is easy to achieve a low floating capacitance as well as impedance matching in the wiring required by higher transfer rates of recording/reproduction signals.

By employing a plurality of parallel thin plate springs, there is an advantage in that it is possible to adjust the rigidity along lateral directions, which may be slightly problematic in a parallel spring mechanism, to a desired rigidity. Although the present embodiment illustrates a structure including three parallel thin plate springs, it will be appreciated that the present invention is also applicable to structures having more, e.g., 4 or 5, parallel thin plate springs.

(Embodiment 3)

Figure 9:
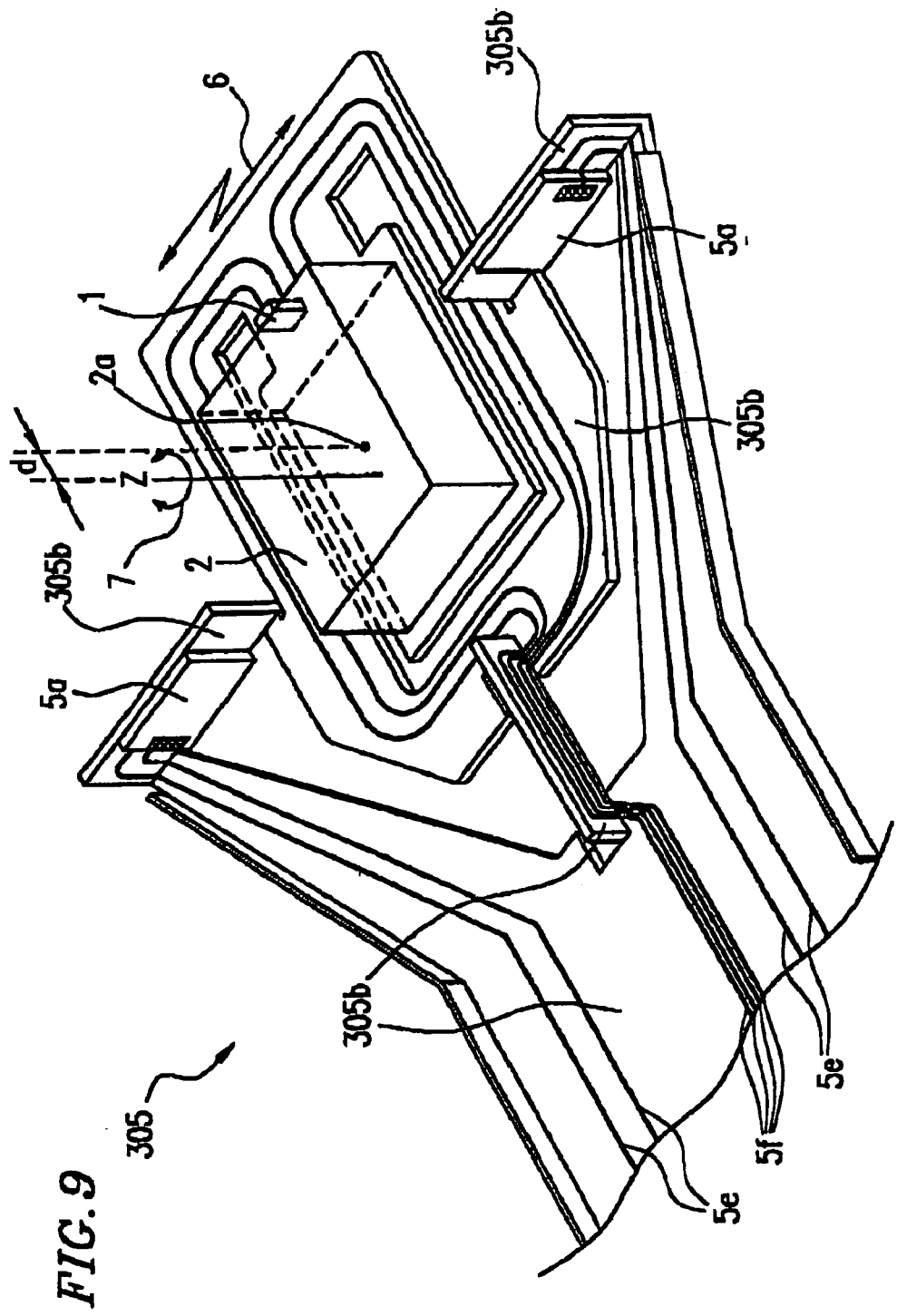
FIG. 9 is a partially-enlarged perspective view showing a head support mechanism according to Embodiment 3.

FIG. 9 is a partially-enlarged perspective view of a head support mechanism 305 according to Embodiment 3 of the present invention. Most of component members and the reference numerals thereof are the same as those described in Embodiments 1 and 2 above, and the detailed description of the same contents will not be repeated. Driving sub-means 5a for the head provided on a flexure 305b in the head support mechanism according to Embodiment 3 rotates around a z axis of a slider 2 that extends in a height direction from the disk, in the neighborhood of the center of gravity 2a of the slider 2.

In FIG. 9, the rotation axis Z which is in a position at a distance d from the center of gravity 2a of the slider, as well as a rotation direction 7 around this, is shown. As the slider rotates around the z axis, a head 1 provided on a rear end face of the slider undergoes micro-movement along tracking directions 6. In this method, slight changes in the azimuth angle of the head occur with tracking. However, the decrease in the recording/reproduction signals associated with changes in the azimuth angle, i.e., azimuth loss, is negligible in practice. Therefore, this rotation driving method can be applied.

In FIG. 9, three thin plate springs are employed in a T-shaped configuration substantially around the z axis. Moreover, the z axis is located near, i.e., at a distance d from, the center of gravity 2a of the slider. On two of the three parallel thin plate springs, micro-movement driving sub-means 5a is provided. On the other thin plate spring, recording/reproduction signal wiring 5f for recording/reproduction signals is provided. In accordance with such a T-shaped configuration, in which the longitudinal direction of the thin plate springs substantially coincides with the tracking directions 6, the slide can be supported via a high rigidity residing in the longitudinal direction of the thin plate springs. Thus, the rigidity along the lateral directions of the head support mechanism can be greatly improved.

Since one of the thin plate springs has its longitudinal direction of the thin plate spring extending in a direction substantially perpendicular to the tracking directions 6, the rigidity in the direction perpendicular to the tracking directions, i.e., the longitudinal direction of the head support mechanism, can be greatly improved. By locating the z axis near, i.e., at a distance d from, the center of gravity 2a of the slider, the rotational inertia of the slider, as an object subjected to rotational driving, can be reduced, thereby enabling high-speed tracking control, as well as enhancing the resonance frequency of the head support mechanism. Thus, high-speed, high-precision tracking control characteristics can be improved. Note, however, that increasing the distance d so as to place the z axis in a direction away from the head 1 has its own advantage. That is, an increased distance between the rotation axis Z and the head 1 makes it possible, for the same rotation angle, that the micro-movement of the head 1 occurs by an increased distance along the tracking directions. In other words, the increased distance adds to the magnification rate of the displacement magnifying mechanism. Although there is a consequent trade-off of an increased rotational inertia, there is a great advantage in that a predetermined displacement required for tracking can be achieved at a low driving voltage. Thus, it is possible to design for a practical performance while maintaining a good balance between both abilities.

Although the above embodiment of the present invention illustrates a T-shaped configuration, various other configurations are contemplated, in addition to the T-shaped configuration, in which the micro-movement driving means for the head are composed of a plurality of spring structures radially extending from a substantial center of rotation, and in which the micro-movement means rotate the slider carrying the head around the center of rotation, thereby causing micro-movement of the head along tracking directions. In principle, three-membered configurations such as a T-shape or a Y-shape; four-membered configurations such as a cross-shape or a X-shape, or higher-numbered configurations such as a star (☆)-shape or an asterisk (*)-shape are possible.
(Embodiment 4)

Figure 10:
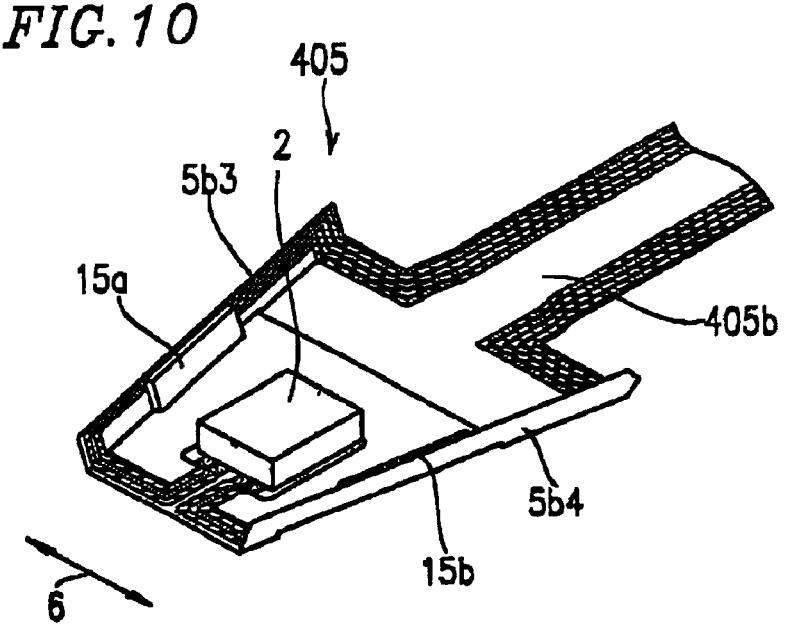
FIG. 10 is a partially-enlarged perspective view illustrating a structure according to Embodiment 4.

FIG. 10 is a partially-enlarged perspective view of a flexure 405b composing a head support mechanism 405 according to Embodiment 4 of the present invention. Component members which are identical to those in Embodiment 1 (FIG. 6A) are denoted by the same reference numerals. Detailed description of such members is omitted.

One difference from the structure of FIG. 6A is that driving sub-means 15a and 15b are disposed in such a manner that extensions of the directions in which the driving sub-means 15a and 15b are disposed constitute predetermined angles with respect to the direction in which the slider 2 is disposed, so as to intersect at a leading end of the flexure 405b. The present embodiment of the invention illustrates an example in which a symmetrical arrangement with respect to the slider 2, such that the width of the flexure 405b decreases toward the leading end.

The operation of the magnetic disk apparatus having the aforementioned structure is the same as that of Embodiment 1, and the description thereof is omitted.

Thus, according to the present embodiment, driving sub-means 15a and 15b, which are disposed in such a manner that extensions of the directions in which the driving sub-means 15a and 15b are disposed constitute predetermined angles with respect to the direction in which the slider 2 is disposed, are provided so as to intersect at the leading end of the flexure 405b. As a result, owing to vector dispersion, the rigidity of the slider support member along the magnetic disk radius direction (direction of an arrow 6 in the figure) can be enhanced relative to structures featuring parallel flat plates. In addition to using the main driving means, a further micro-movement adjustment of the magnetic head which has been moved can instantaneously be made. Thus, a stable and fast on-track control of the magnetic head can be achieved with narrow track pitches on the sub-micron order.
(Embodiment 5)

Figure 11:
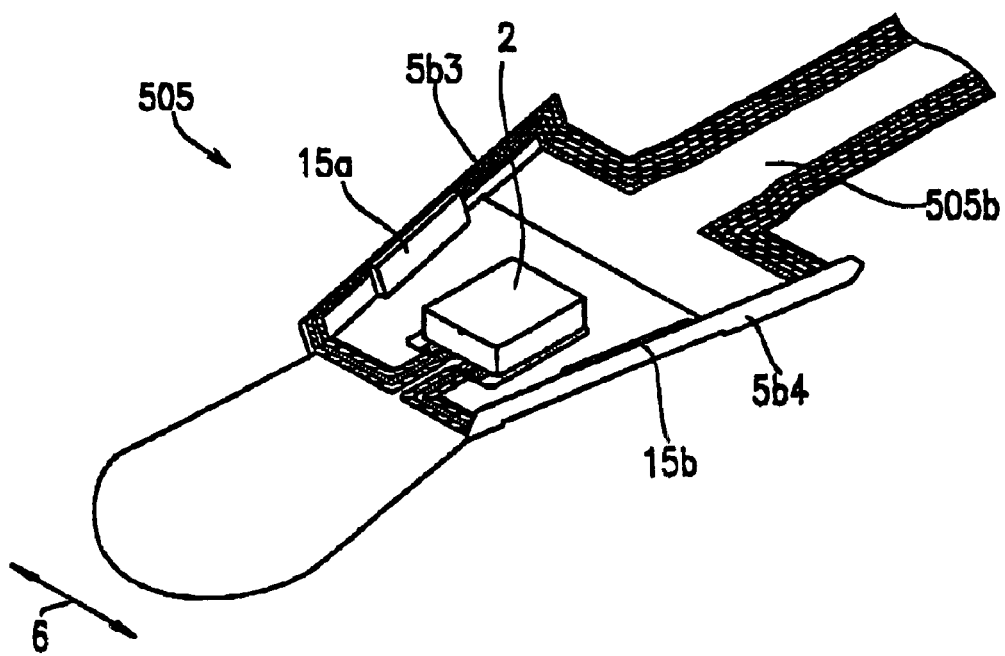
FIG. 11 is a partially-enlarged perspective view illustrating a structure according to Embodiment 5.

FIG. 11 is a partially-enlarged perspective view of a flexure 505b composing a head support mechanism 505, according to Embodiment 5 of the present invention. Component members which are identical to those in Embodiment 4 (FIG. 10) are denoted by the same reference numerals. Detailed description of such members is omitted.

Figure 12:
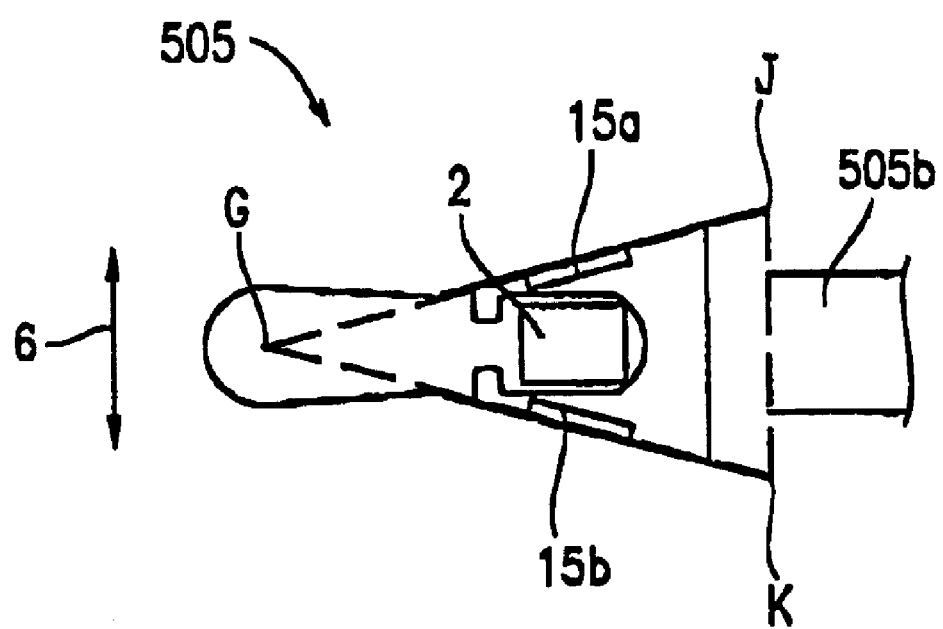
FIG. 12 is a partially-enlarged plan view illustrating a structure according to Embodiment 5.

One difference from the structure of FIG. 10 is that driving sub-means 15a and 15b are disposed in such a manner that the center of gravity G of the flexure 505b is located in the vicinity of an intersection between extensions of directions in which the driving sub-means 15a and 15b are disposed. FIG. 12 is a partially-enlarged plan view of the flexure 505b according to Embodiment 5 of the present invention. G denotes the center of gravity of the flexure 505b. As shown in FIG. 12, a triangular structure having apices G, J, and K (shown by a broken line in the figure) is formed.

The operation of the magnetic disk apparatus having the aforementioned structure is the same as that of Embodiment 1, and the description thereof is omitted. Thus, according to Embodiment 5, the driving sub-means 15a and 15b are provided in such a manner that the center of gravity G of the flexure 505b is located in the vicinity of an intersection between extensions of directions in which the driving sub-means 15a and 15b are disposed. Thus, this structure prevents external mechanical forces which are applied to the center of gravity of the flexure 505b to unfavorably affect driving control (e.g., wind pressure of air flow, inertial forces, disturbance impacts, and the like), acting on the flexure 505b along the magnetic disk radius direction, from being transmitted. As a result, the rigidity of the flexure 505b along the magnetic disk radius direction can be made very high. In addition to using the main driving means, a further micro-movement adjustment of the magnetic head which has been moved can instantaneously be made. Thus, a stable and fast on-track control of the magnetic head can be achieved with narrow track pitched on the sub-micron order.

Figure 13:
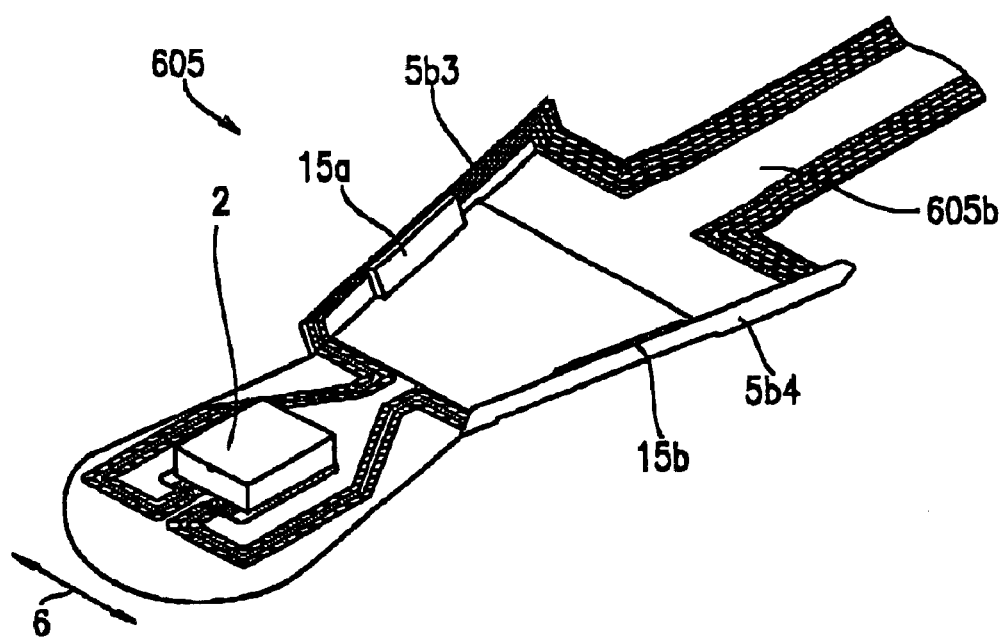
FIG. 13 is a partially-enlarged perspective view illustrating a structure according to Embodiment 5.

Although the above description illustrates an example, as shown in FIG. 11, in which the flexure 505b has a shape extending out toward the leading end to shift the center of gravity thereby, the slider 2 may be relocated at the leading end as shown in FIG. 13, so that the center of gravity of a flexure 605b is located in the vicinity of an intersection between extensions of the directions in which the driving sub-means 15a and 15b are disposed.

Figure 14:
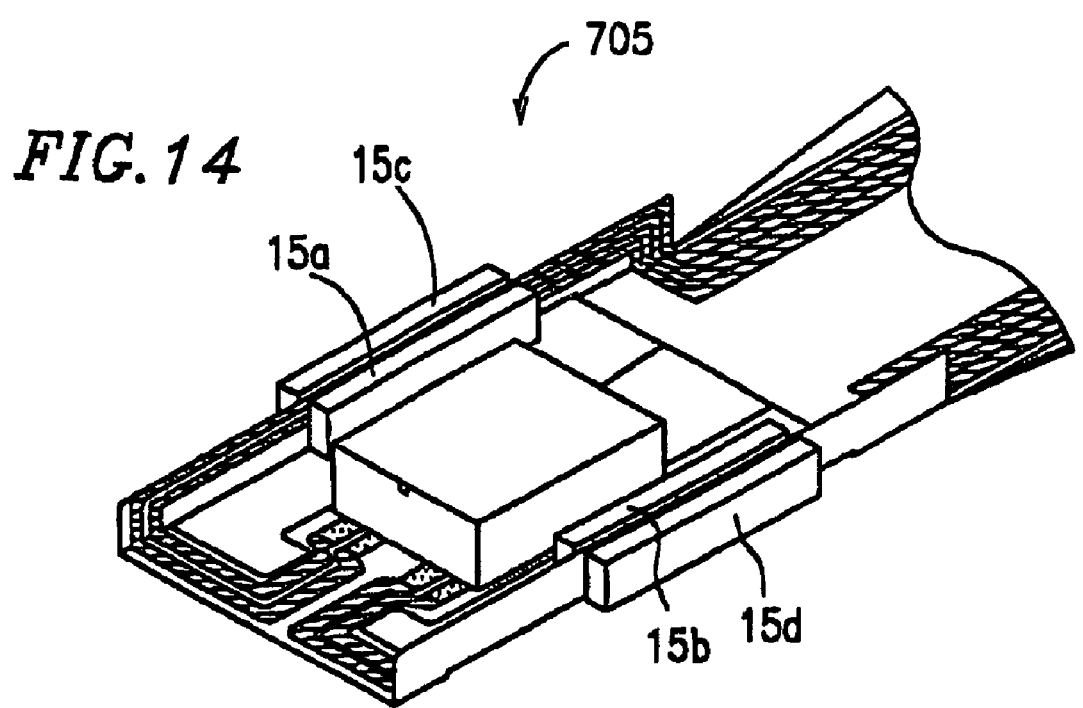
FIG. 14 is a partially-enlarged perspective view showing another head support mechanism according to Embodiment 5.

Although the above description illustrates a pair of driving sub-means 15a and 15b being provided on the flexure, two or more pairs of driving sub-means (shown as 15c and 15*d*) may be provided as shown in FIG. 14 with a view of increasing the driving force and the driving amount.

Figure 15A:
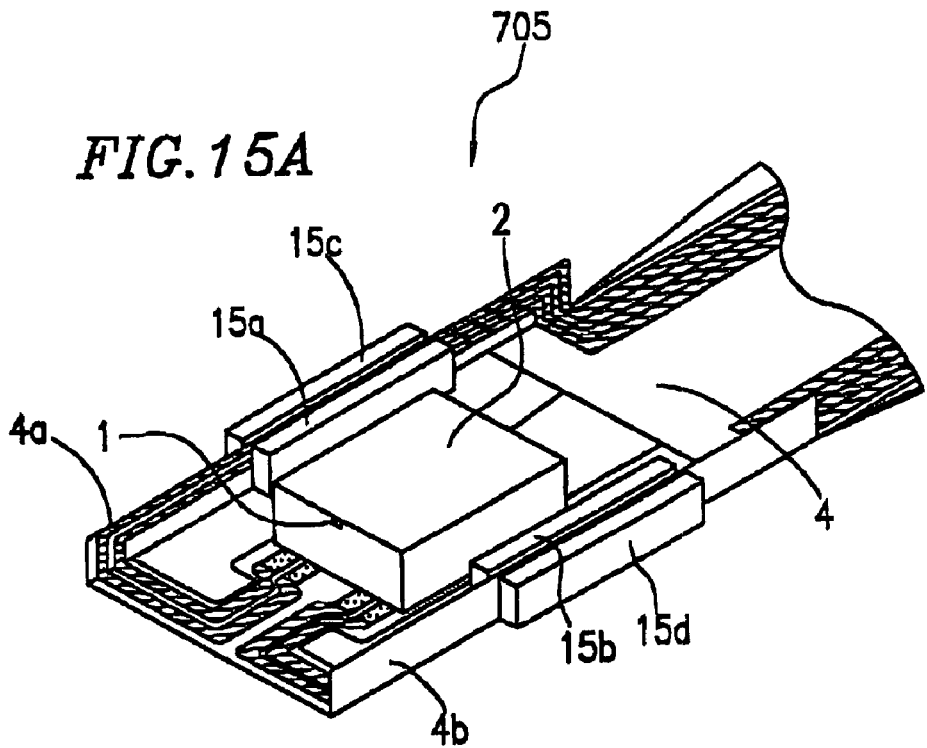
FIG. 15A is a perspective view showing another head support mechanism according to Embodiment 5 prior to the application of a driving voltage.
Figure 15B:
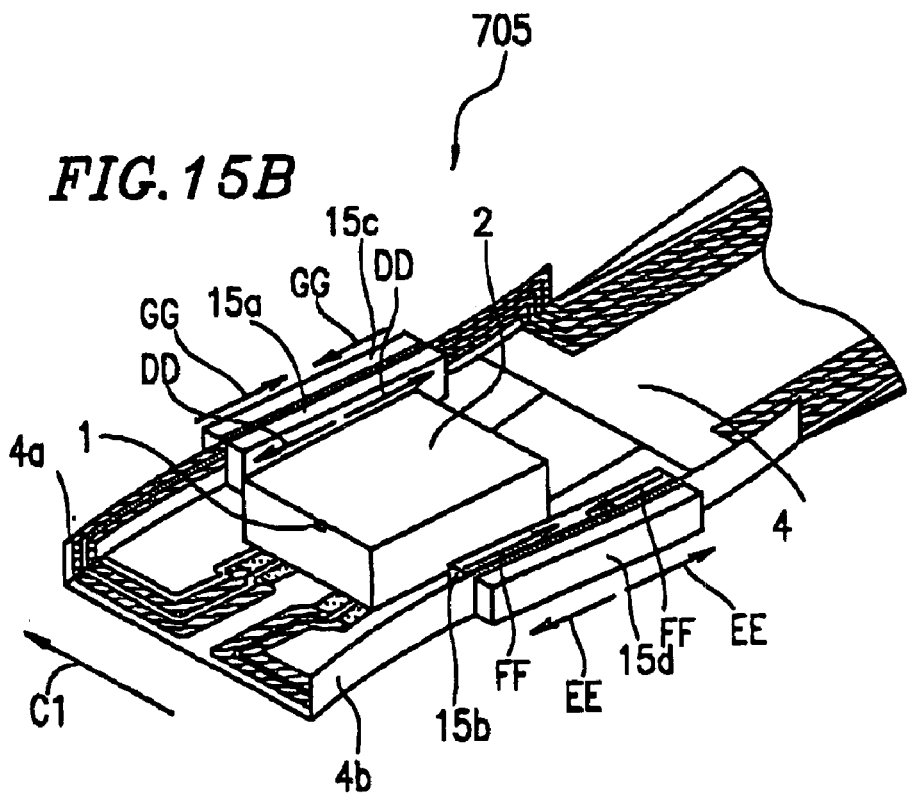
FIG. 15B is a perspective view showing another head support mechanism according to Embodiment 5 after the application of a driving voltage.
Figure 16A:
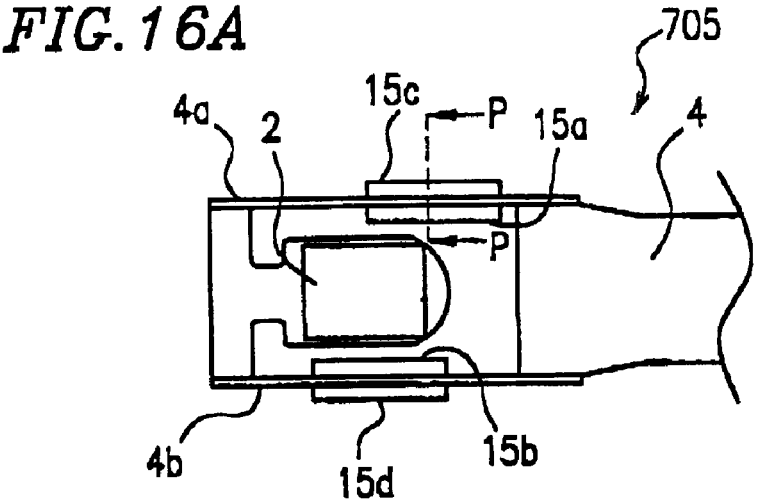
FIG. 16A is a plan view of another head support mechanism according to Embodiment 5 prior to the application of a driving voltage.
Figure 16B:
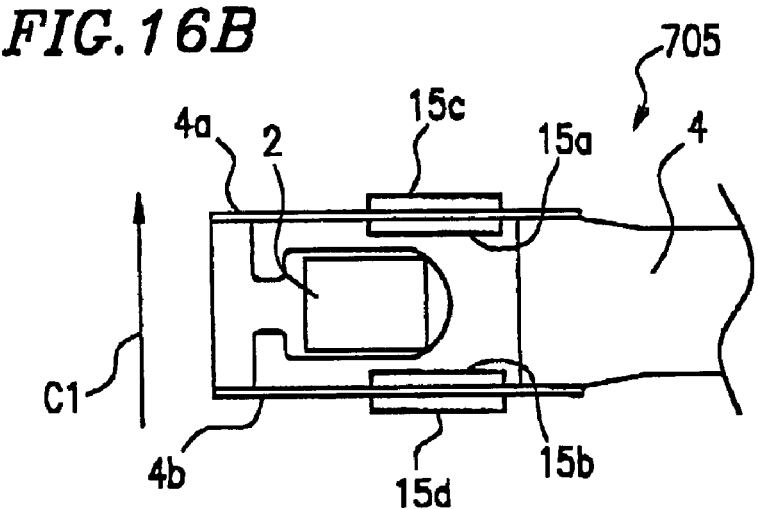
FIG. 16B and FIG. 16C are plan views of another head support mechanism according to Embodiment 5 after the application of a driving voltage.
Figure 16C:
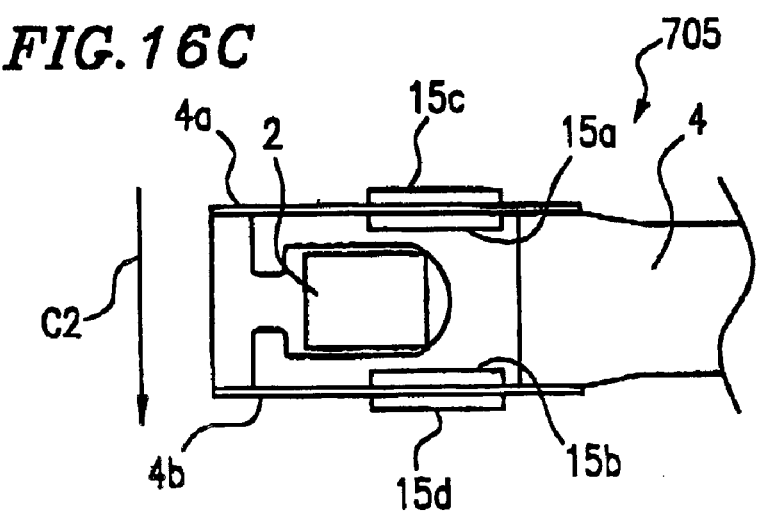

The driving principles for a head support mechanism 705 according to the present invention shown in FIG. 14, which includes two or more pairs of driving sub-means (shown as 15*c* and 15*d*), will be described. FIG. 15A is a perspective view of a head support mechanism 705 prior to the application of a driving voltage. FIG. 15B is a perspective view of the head support mechanism 705 after the application of a driving voltage. FIG. 16A is a plan view of the head support mechanism 705 prior to the application of a driving voltage. FIGS. 16B and 16C are plan views of the head support mechanism 705 after the application of a driving voltage. Elements which are described in Embodiment 4 (FIG. 10) are denoted by the same reference numerals. Detailed description of such members is omitted.

FIGS. 15A and 16A illustrate a state in which, in the absence of a driving voltage applied to the driving sub-means 15*a* to 15*d*, the driving sub-means 15*a* to 15*d* do not expand or shrink, so that the head 1 does not undergo micro-movement.

Referring to FIGS. 15B and 16B, an example will be described in which a driving voltage is applied to each of driving sub-means 15*a* to 15*d* so that the driving sub-means 15*a* expands along the direction of an arrow DD; the driving sub-means 15*c* shrinks along the direction of an arrow GG; the driving sub-means 15*d* expands along the direction of an arrow EE; and the driving sub-means 15*b* shrinks along the direction of an arrow FF. As a result of the expansion of the driving sub-means 15*a* and the compression of the driving sub-means 15*c*, a bent portion 4*a* warps in the direction of an arrow C1. As a result of the compression of the driving sub-means 15*d* and the compression of the driving sub-means 15*b*, a bent portion 4*b* also warps is the direction of the arrow C1, as does the bent portion 4*a*. Consequently, the leading end of the flexure 4 is translated in the direction of the arrow C1. As a result, the slider 2 and the head on the flexure 4 are translated in the direction of the arrow C1.

With reference to FIG. 16C, where the plus and minus of the driving voltages which are applied to the driving sub-means 15*a* to 15*d* are reversed, the driving sub-means 15*a* shrinks; the driving sub-means 15*c* expands; the driving sub-means 15*d* shrinks; and the driving sub-means expands, is contrast to the example illustrated in FIGS. 15B and 16B. As a result, the slider 3 and the head are translated in the direction of as arrow C2, as shown in FIG. 16C.

The base material for the flexure 4 may be any thin plate material having elasticity. However, it is desirable to employ a thin metal plate, e.g., a stainless steel sheet having a thickness of 0.3 $\mu$m to 50 $\mu$m, with a thin film piezoelectric member having a thickness of 10 $\mu$m or less (e.g., PZT, PLT, or PLZT) and electrodes formed thereon, whereby an appropriate flexural rigidity, which is required for the flexure 4, and a driving efficiency for obtaining a large displacement through low voltage driving, which is required for tracking, can be reconciled.

In order to realize an ideal translation mechanism so that the locus of the slider 2 movement becomes parallel to the tracking directions C1 and C2, bent portions 4*a* and 4*b* are provided on the flexure 4 to form driving sub-means 15*a* to 15*d*, and the leading end of the flexure 4 is composed of a thin parallel-plate spring structure.

By utilizing the warping of the driving sub-means is the thickness direction (i. e., the C1 or C2) thereof as driving means for causing the head 1 to have a micro-movement, it is possible to obtain a large displacement required for tracking through low voltage driving. For example, it can be confirmed with a Doppler displacement meter that a translation of 2.2 $\mu$m occurs with a driving voltage of 6 V. The driving mechanism discussed in the prior art section cannot cause a displacement on the order of 1 $\mu$m with such a low voltage.

(Embodiment 6)

A method for manufacturing a head support mechanism according to Embodiment 6 will be described. FIGS. 17A to FIG. 17D are cross-sectional views illustrating a method for manufacturing a driving sub-means utilizing a direct film growth process. FIG. 18 is a flowchart illustrating a method for manufacturing a head support mechanism with driving sub-means formed thereon, utilizing a direct film growth process.

Figure 17A:
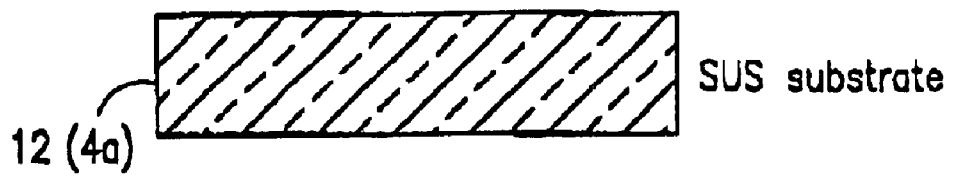
FIG. 17A to FIG. 17D are cross-sectional views illustrating a method for manufacturing driving sub-means according to Embodiment 6 utilizing a direct film growth process.
Figure 17B:
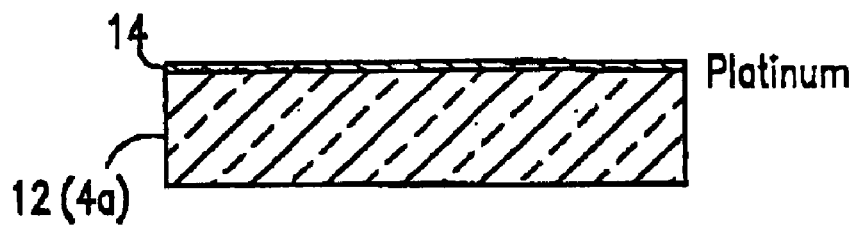
Figure 17C:
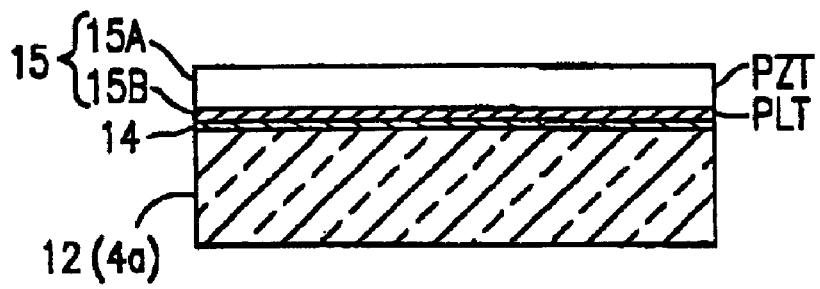
Figure 17D:
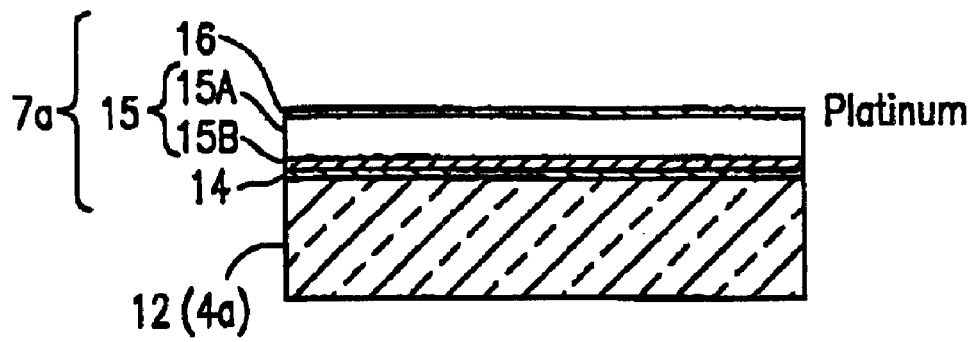
Figure 18:
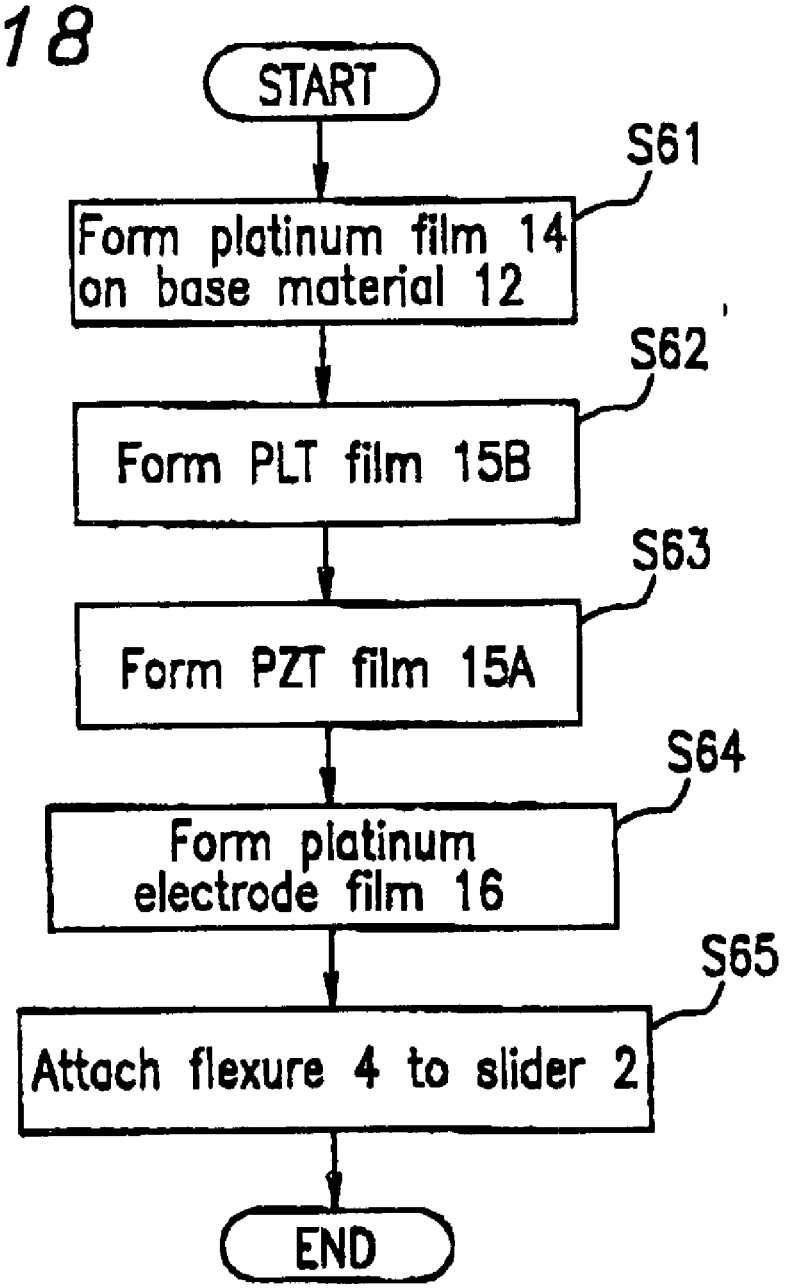
FIG. 18 is a flowchart of a method for manufacturing a head support mechanism according to Embodiment 6 utilizing a direct film growth process.

With reference to FIGS. 17A to 17D and FIG. 18, a base material 12 is formed so as to have a thickness of 0.5 $\mu$m to 50 $\mu$m (FIG. 17A). A base material 16A corresponds to bent portions 4*a* formed on the flexure 4 shown in FIG. 4A. In the case where the base material 12 is a SUS (stainless steel) material, an external shape is hollowed out through etching, laser processing, or pressing, and thereafter is subjected to press forming.

By platinum (Pt) sputtering, a Pt film 16 is formed on the base material 12 through a direct vacuum film growth (FIG. 17B, S61). The Pt film 14 may be obtained by growing a plating film in a liquid. Alternatively, by using a shadow mask method or a lift-off method, the Pt film 14 may be grown only where it is desirable to grow a thin film piezoelectric (PZT, ZnO, or the like; described later) by a rf sputtering method, an ion beam sputtering method, a sol-gel method, a CVD method, a laser ablation method, or the like. Alternatively, the Pt film 14 may be directly vapor-deposited on the base material 12 formed of SUS.

When growing a PST film 15A on the Pt film 14 by an rf sputtering method, a PLT film 15B containing no or little Zr may be formed as an underlying layer for the PST film 15A, so that a PZT film 15A having excellent characteristics can be formed on that underlying layer (FIG. 17C, S62, S63).

By forming a Pt electrode film 16 on PZT film 15A, a flexure 4 having driving sub-means 16*a* thereon is completed (FIG. 17D). It is desirable that the total film thickness excluding the base material 12 (i. e., Pt 14, PLT 15B, PZT 15A, and Pt 16) does not exceed 10 $\mu$m.

By attaching a slider 2 carrying a load beam 5 and a head 1 thereon to the flexure 4 having the driving sub-means 15*a* thereon, and forming a signal system, the head support mechanism is completed.

An example has been described in which, in the case where the base material 12 is a SUS (stainless steel) material, as external shape is hollowed out through etching, laser processing, or pressing, and thereafter is subjected to press forming, followed by the attachment of the Pt film 14. However, etching, laser processing, or pressing may be carried out after completing the formation of all of the films (Pt 14, PLT 15B, PZT 15A and Pt 16) to pattern the base material 12 composed of SUS. The base material 12 is not limited to SUS, but and may be a silicon (Si) semiconductor wafer, which can be produced in large quantities with low cost.

By applying such a film growth process to each of the front and back sides of the base material 12, a suspension having a bimorph type actuation function as shown in FIG. 14 can be produced. As shown in FIG. 14, portions of the flexure 4, which is a base material composed of SUS, are bent perpendicularly in such a manner as to interpose the slider 2, thereby forming bent portions 4*a* and 4*b*. Furthermore, driving sub-means 15*c* and 15*d* are formed on the opposite side (back side) of the bent portions 4a and 4b from the slider 2. The driving sub-means 15c and 15d formed an the back side are also formed via the aforementioned direct film growth process from the back side of the base material 12.

The head support mechanism 705 incorporating the flexure 4 (SUS substrate) having the bent portions 4a and 4b formed thereon, serves as a head support mechanism having micro-movement driving means composed of a thin plate parallel spring structure. Experimental results show that a translation of about 1 μm occurs with a driving voltage of 5 V.

The Pt film 14 underlying the thin film piezoelectric 15 can be replaced by a metal material such as titanium (Ti) or the like. PZT 15A or PLT 15B can be replaced by zinc oxide (ZnO), polyvinylidene fluoride (PVDF), or a multilayer structure having a combination thereof.

Note that, an insulation film may be formed on the base material 12, after which the PT film 14 may be formed on the insulation film. An the insulation film, SiN can be employed, for example. SiN can be vapor-deposited an the base material 12.

By covering the thin film piezoelectric 15 with an insulation film such as polyimide and sintering the thin film piezoelectric 15, the thin film piezoelectric 15 can be insulated from the Pt 14, and mechanical characteristics such as contact with the base material 12 can also be improved. As the insulation film, an SAM film, an LB film, or a material whose main component is a nitride, may also be used, among others.

Each of the films forming the driving sub-means is grown through a vacuum chamber process. Each film can also be grown by using a process in a liquid.

As described above, according to Embodiment 6, a head support mechanism including micro-movement driving means which realizes high-speed and high-precision tracking so as to be compatible with narrow track pitches required due to an increasing areal recording density while the micro-movement driving means is easy to produce (via a direct film growth process) and is driven with a low driving voltage at a practical level; an information recording/reproducing apparatus incorporating the same; and a method of manufacturing the head support mechanism can be provided.

By employing a direct film growth process, there is also an advantage in that as inexpensive head support mechanism can be realized because the head support mechanism can be produced in clusters through batch processes.

(Embodiment 7)

A method for manufacturing ahead support mechanism according to Embodiment 7 will be described. FIGS. 19A to 19F are cross-sectional views illustrating a method for manufacturing driving sub-means using a transcription process. FIGS. 19A to 19F are cross-sectional views showing a cross section PF in FIG. 16A. FIG. 20 is a flowchart illustrating a method for manufacturing a head support mechanism on which driving sub-means is formed, utilizing a transcription process. A head support mechanism incorporating driving sub-means (micro-movement driving means) can be produced also by using a transcription process.

Figure 19A:
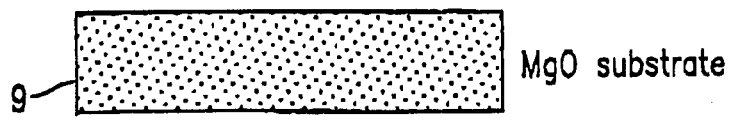
FIG. 19A to FIG. 19F are cross-sectional views illustrating a method for manufacturing driving sub-means according to Embodiment 7 utilizing a transcription process.
Figure 19B:
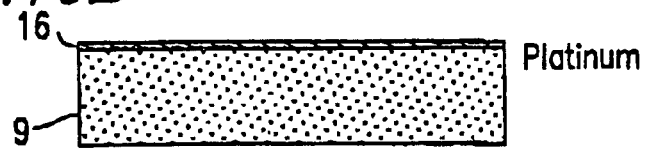
Figure 19C:
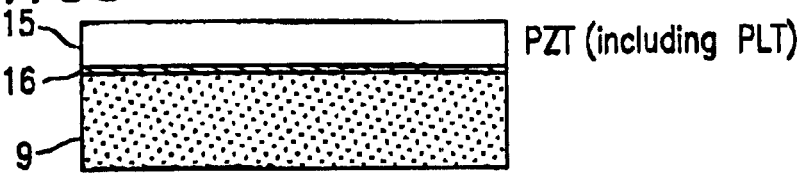
Figure 19D:
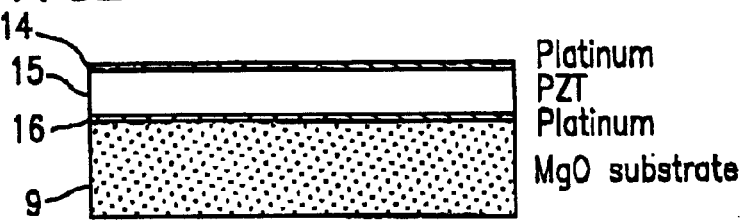
Figure 19E:
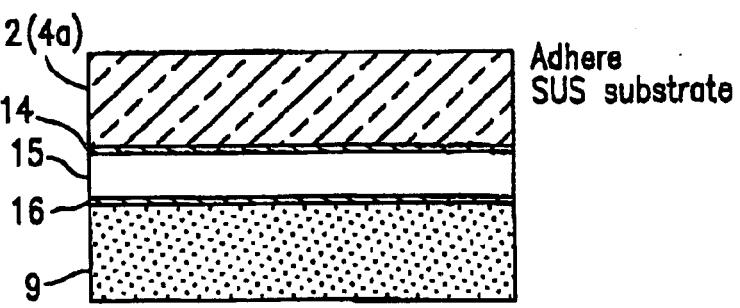
Figure 19F:
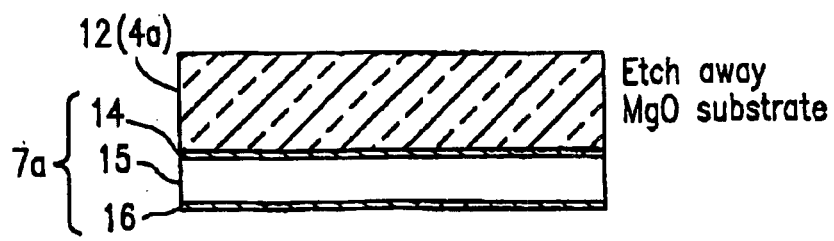
Figure 20:
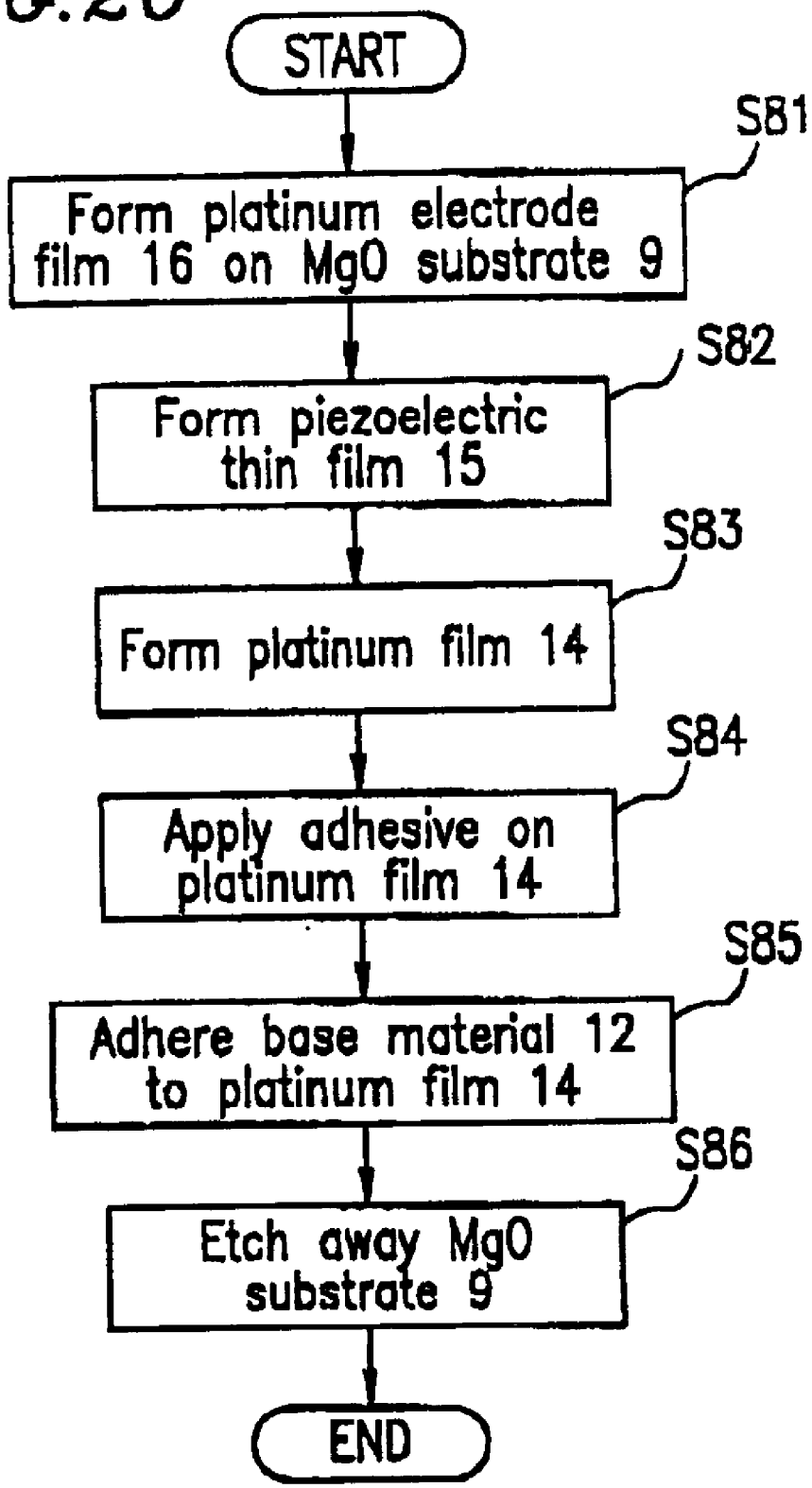
FIG. 20 is a flowchart of a method for manufacturing a head support mechanism having driving sub-means formed thereon according to Embodiment 7 utilizing a transcription process.

With reference FIGS. 19A to 19F and FIG. 20, a magnesium oxide (MGO) substrate 9 is formed (FIG. 19A). On the MGO substrate 9, a PL electrode film 16 is formed by Pt sputtering (FIG. 19B. S81). By using a shadow mask method, a lift-off method or the like, a Pt film 16 is grown only where it is desirable to grow a thin film piezoelectric 15 (e. g., PZT or ZnO).

On thin film piezoelectric 15, thin film piezoelectric 15 (a PLT film+a PST film) and a platinum film 14 are grown by an rf sputtering method or the like (FIGS. 19C and 19D, S82, S83). At this time, too, it is desirable that the film thickness does not exceed 10 μm. These processes are basically the same as the direct film growth process described is FIGS. 17A to 17D.

An adhesive is applied on the platinum film 14, and thereafter a SUS (stainless steel) substrate 12 having a thickness of 0.5 μm or more and 50 μm or less, a substrate whose basic composition is Si, or the like is further adhered as a base material (FIG. 19E, S84, S85). The SUS (stainless steel) substrate 12 or the substrata whose basic composition is Si corresponds to the bent portions 4a formed on the flexure 4 shown in FIG. 4A.

After the adhesive to dried at about 70° C., the MgO substrate 9 is removed wet etching (FIG. 19F, S86), whereby the flexure 4 having the driving sub-means 15a is completed. The completed flexurs product having the driving sub-means which is manufactured by a transcription process is basically the same as a completed flexure product having the driving sub-means which is manufactured by a direct film growth process.

Prior to forming the PZT film after forming the Pt film 16 through vapor deposition, a PLT film may be formed, whereby the PZT thin film piezoelectric can be obtained as a film having excellent characteristics. Substantially the same characteristics can be obtained by employing a PT film, a PBTi03 film, an 6rTi03 film, a BaTi03 film, etc., instead of a PLT film. Instead of the magnesium oxide MgO used for the transcription substrate, a single-crystal substrate such as sapphire (α-A1204) or strontium titanate, or a silicon single-crystal substrate may be employed to enable transcription.

Since the thin film piezoelectric 15 of FLT, PZT, etc., is grown at a high temperature in the vicinity of 600° C., it is better to later form wiring a required for the voltage application to the driving sub-means, in order to allow the suspension having an actuation function to be subjected to the process without exposing the wiring itself to a high temperature.

Thus, according to Embodiment 7, a head support mechanism including micro-movement driving means which realizes high-speed and high-precision tracking so as to be compatible with narrow track pitches required due to an increasing areal recording density while the micro-movement driving means is easy to produce (via a transcription process) and is driven with a low driving voltage at a practical level; an information recording/reproducing apparatus incorporating the same; and a method of manufacturing the head support mechanism can be provided.

By employing a transcription process, there is also an advantage in that an inexpensive head support mechanism can be realised because the head support mechanism can be produced in clusters through batch processes, similarly to the case where a direct film growth process is employed.

(Embodiment 8)

Figure 21:
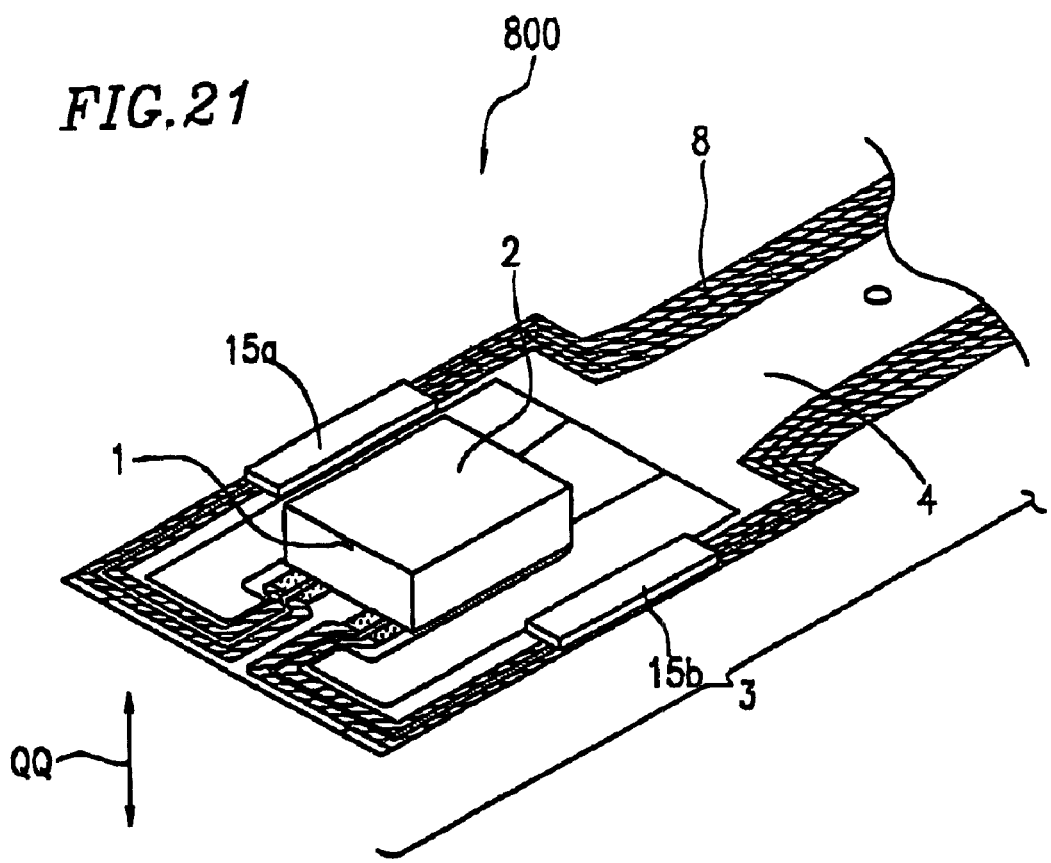
FIG. 21 is a partially-enlarged perspective view showing head support mechanism according to Embodiment 8.

FIG. 21 is a partially-enlarged perspective view of a head support mechanism according to Embodiment 8. Elements which are described in Embodiment 1 with reference to FIG. 6A are donated by the same reference numerals. Detailed description of such members in omitted.

With reference to FIG. 21, a head support mechanism 800 according to embodiment 8 differs from the head support mechanism 105 according to Embodiment 1 in that driving sub-means 15a and 15b are formed on a flexure 4 in such a manner that a thickness direction thereof (direction of as arrow QQ) is substantially perpendicular to the magnetic disk surface.

Figure 22A:
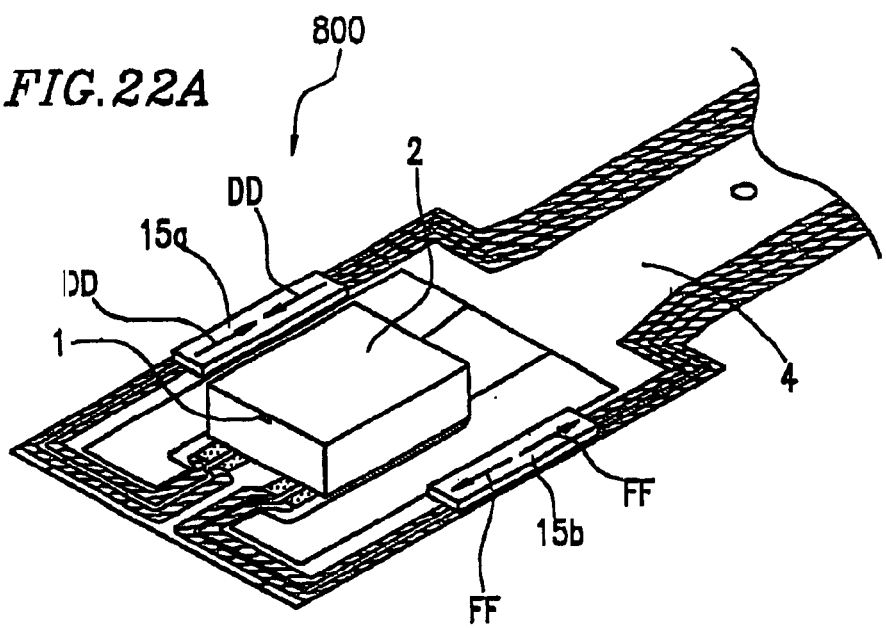
FIG. 22A is a perspective view illustrating the expansion/shrinkage of driving sub-means formed on a head support mechanism according to Embodiment 8 after the application of a driving voltage.
Figure 22B:
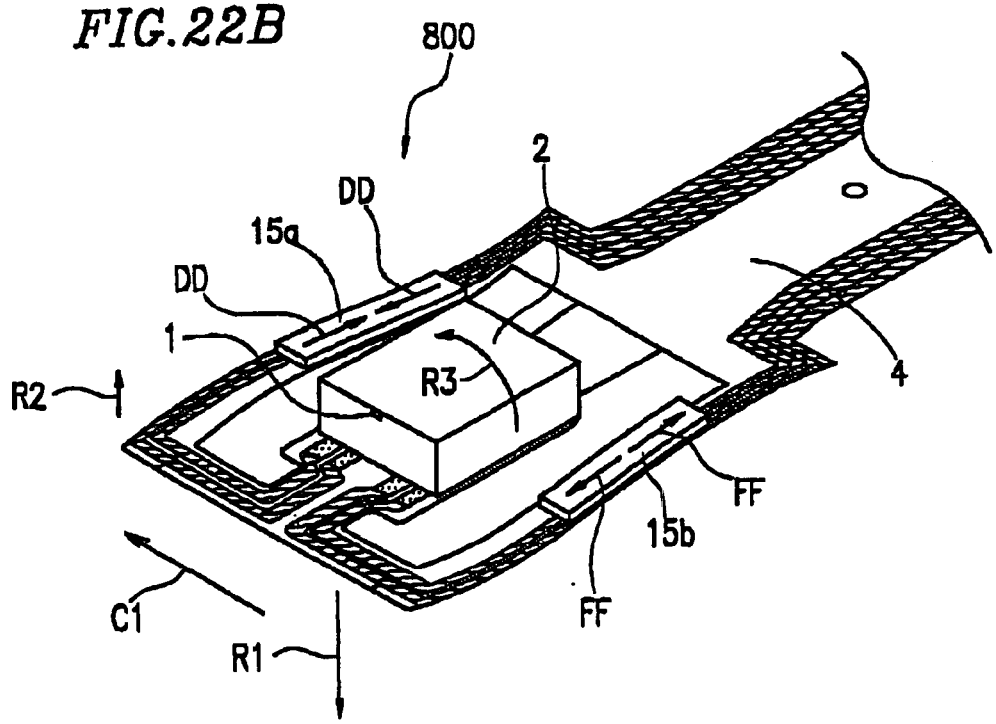
FIG. 22B is a perspective view illustrating a translation of a head support mechanism according to Embodiment 8 after the application of a driving voltage.

The driving principles for head support mechanism 800 according to Embodiment 8 will be described. FIG. 22A is a perspective view illustrating the expansion/shrinkage of the driving sub-means 15a and 15b formed on the head support mechanism 800 after the application of a driving voltage. FIG. 22B is a perspective view illustrating the translation of the head support mechanism 800 after the application of a driving voltage.

With reference to FIG. 22A, when driving voltages are applied such that the driving sub-means 15a and. 15b will expand or shrink in reverse phases, the driving sub-means 15a shrinks in the direction of an arrow DD, whereas the driving sub-means 15b expands in the direction of an arrow FF.

With reference to FIG. 22B, when driving voltages are applied to the driving sub-means 15a and 15b in reverse phases so that an absolute value of the driving voltage to the driving sub-means 15b is sufficiently greater than an absolute value of the driving voltage to the driving sub-means 15a, a portion of the flexure 4 on which the driving sub-means 15b is formed has a sufficiently large warp in the direction of an arrow R1, whereas a portion of the flexure 4 on which the driving sub-means 15a is formed has a small warp in the direction of an arrow R2.

If the warps in the directions of the arrow N1 and R2 are restrained, a displacement difference corresponding to the δH2 described with reference to FIG. 7E, 7F, and 7G occurs. As a result, a rotation movement occurs in the direction of an arrow R3, around a leading end of the flexure 4.

Consequently, the slider 2 and the head on the flexure 4 have a rotation movement in the direction of the arrow R3.

If the polarity and the size of the driving voltages applied to the driving sub-means 15a and 15b are reversed relative to those described above, the driving sub-means 15a expands and the driving sub-means 15b shrinks, so that the leading end of the flexurs 4 is translated in an opposite direction of the arrow C1.

Thus, according to Embodiment 8, by applying driving voltages to the sub-means 16a and 15b in reverse phases, highly precise and efficient micro displacement of the head for tracking, can be realized.

Figure 23A:
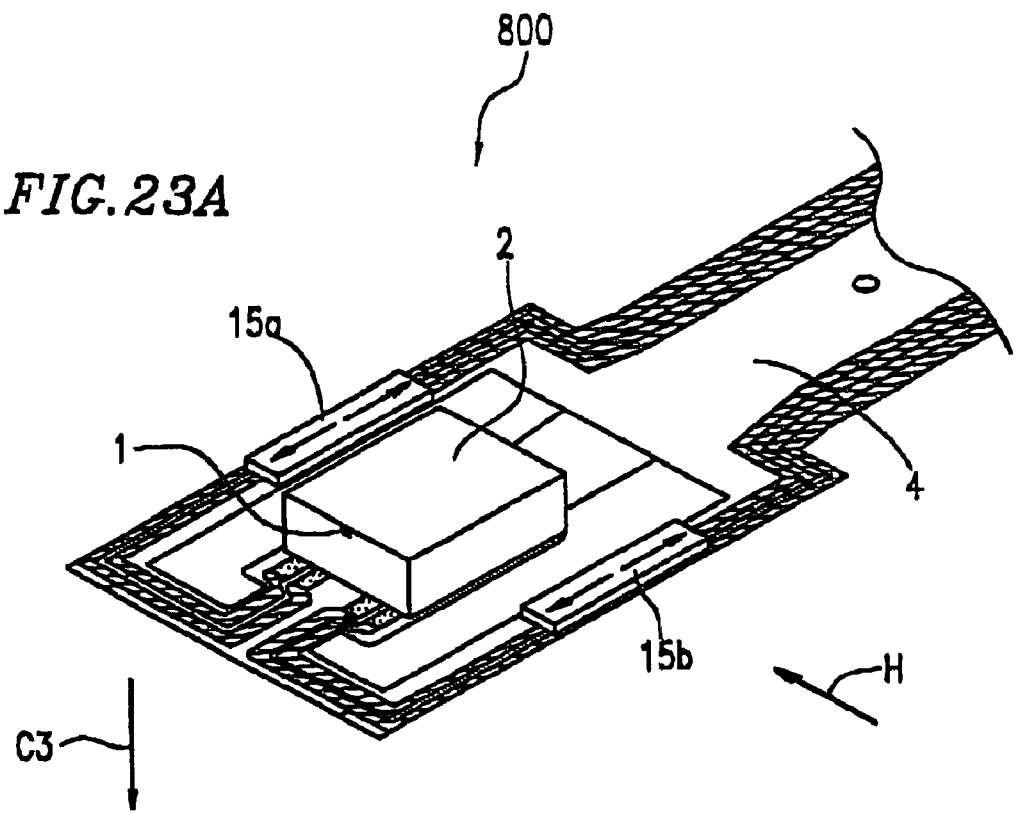
FIG. 23A is a perspective view illustrating the expansion/shrinkage of driving sub-means formed on a head support mechanism according to Embodiment 8 after the application of a driving voltage.
Figure 23B:
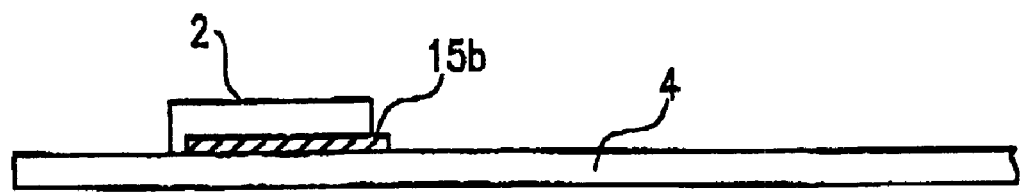
FIG. 23B is a diagram illustrating the state of driving sub-means and a flexure according to Embodiment 8 prior to the application of a driving voltage.
Figure 23C:
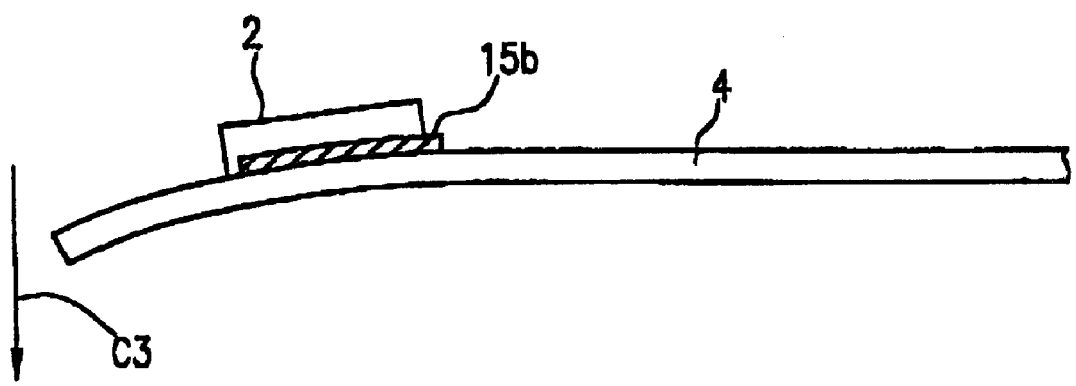
FIG. 23C is a diagram illustrating the state of driving sub-means and a flexure according to Embodiment 8 after the application of a driving voltage.

A variant of the driving principles for the head support mechanism 800 according to Embodiment 8 will be described. In this variant, voltages are applied to the driving sub-means 15a and 15b. FIG. 23A is a perspective view illustrating the expansion/shrinkage of the driving sub-means 15a and 15b formed on the head support mechanism 800 after the application of a driving voltage. FIG. 23B is a diagram illustrating a state of the driving sub-means 15b and the flexure 4 prior to the application of a driving voltage. FIG. 23C is a diagram illustrating a state of the driving sub-means 15b and the flexure 4 after the application of a driving voltage.

With reference to FIGS. 23A to 23C, when driving voltages are applied such that the driving sub-means 15a and 15b will both expand, the leading end of the flexure 4 will warp in the direction of the arrow C3. As a result, the slider 2 leaves the surface of the magnetic disk.

Thus, according to Embodiment 8,the leading end of the flexure 4 warps in such a direction that the slider 2 will leave the surface of the magnetic disk, whereby friction between the magnetic disk and the head 1 carried by the slider 2 can be avoided.

Furthermore, when the head support mechanism 800 is driven according to the aforementioned driving principles, the head support mechanism 800 can be utilized as a loading/unloading mechanism for the head, and accidents such as a head crash can be prevented.

(Embodiment 9)

Figure 24A:
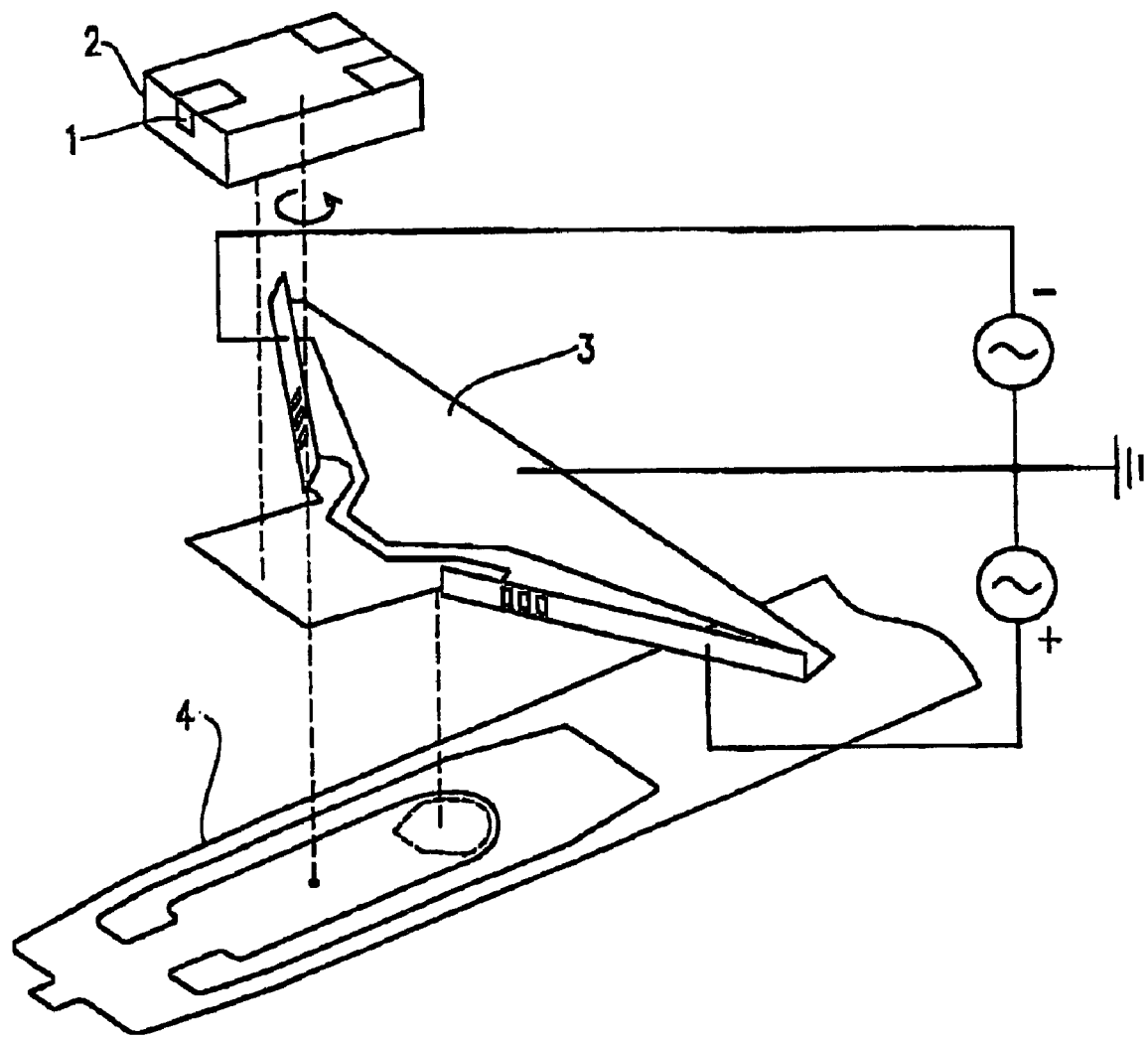
FIG. 24A, 24B and 24C are diagrams showing relative positions of a driving element of an actuator portion and a disk surface according to Embodiment 9.

FIG. 24A illustrates a basic structure for a three-electrode type two-stage actuator according to Embodiment 9.

Figure 24B:
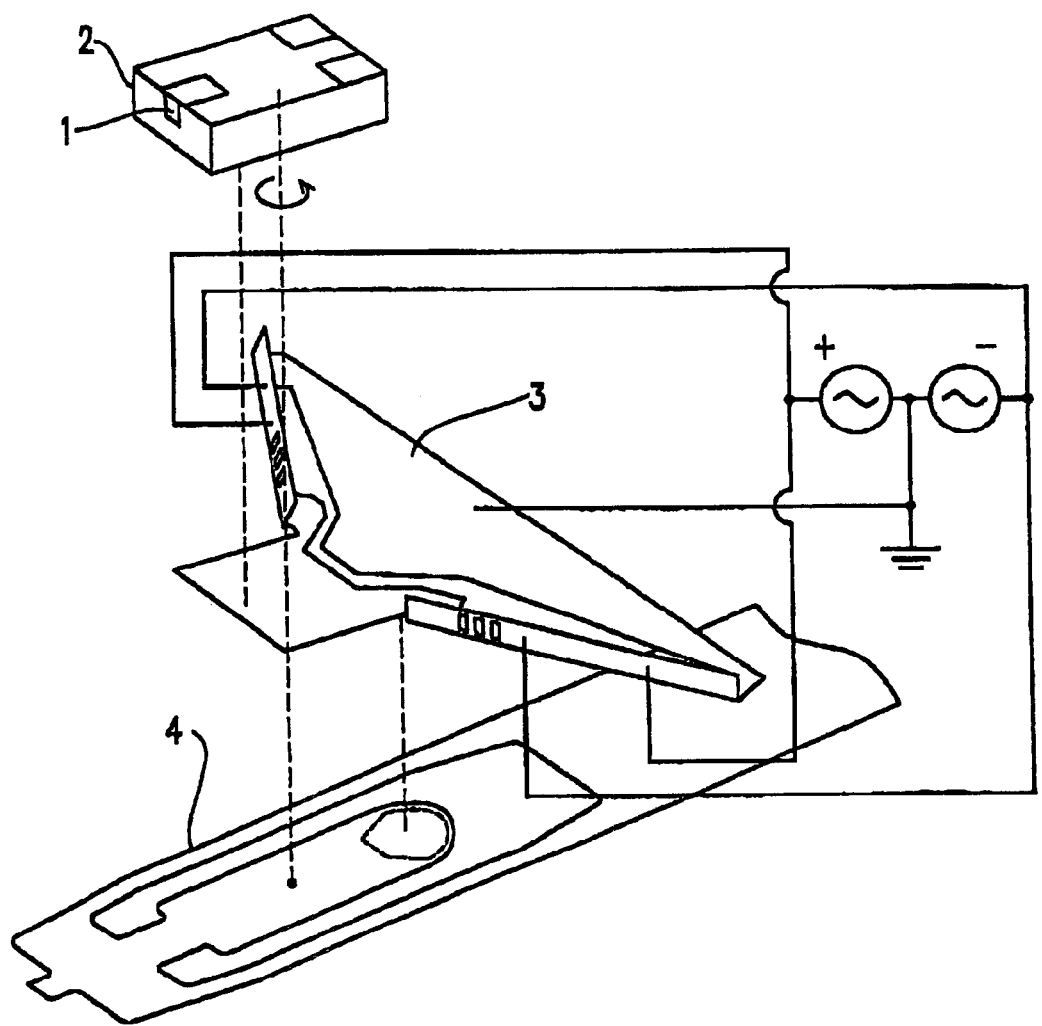

The head support mechanism includes: a slider 2 which carries a head element 1 and flies or hovers above a rotating or running recording medium; a suspension 3 for supporting the same; a flexure 4 for fixing the suspension 3; and a signal system (not shows) for electrically coupling the head element 1 to a recording/reproducing circuit of an information recording apparatus, such that a whole or part thereof is formed in an integral manner. Wiring is achieved via printed circuit boards, directly or indirectly to the signal system lead wires or the suspension. A micro-driven actuator, which is of an integral form with the suspension 3, is disposed between the slider 2 composing the head element 1 and the flexure 4. FIG. 24B illustrates a basis structure for a five-electrode type two-stage actuator.

Figure 24C:
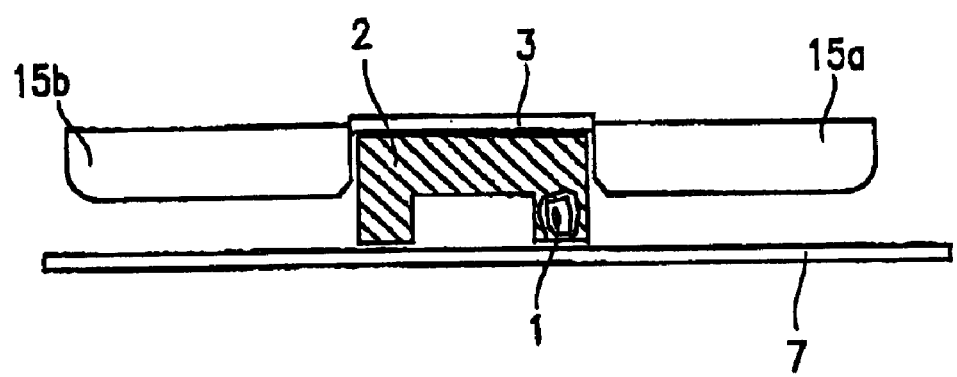
Figure 25:
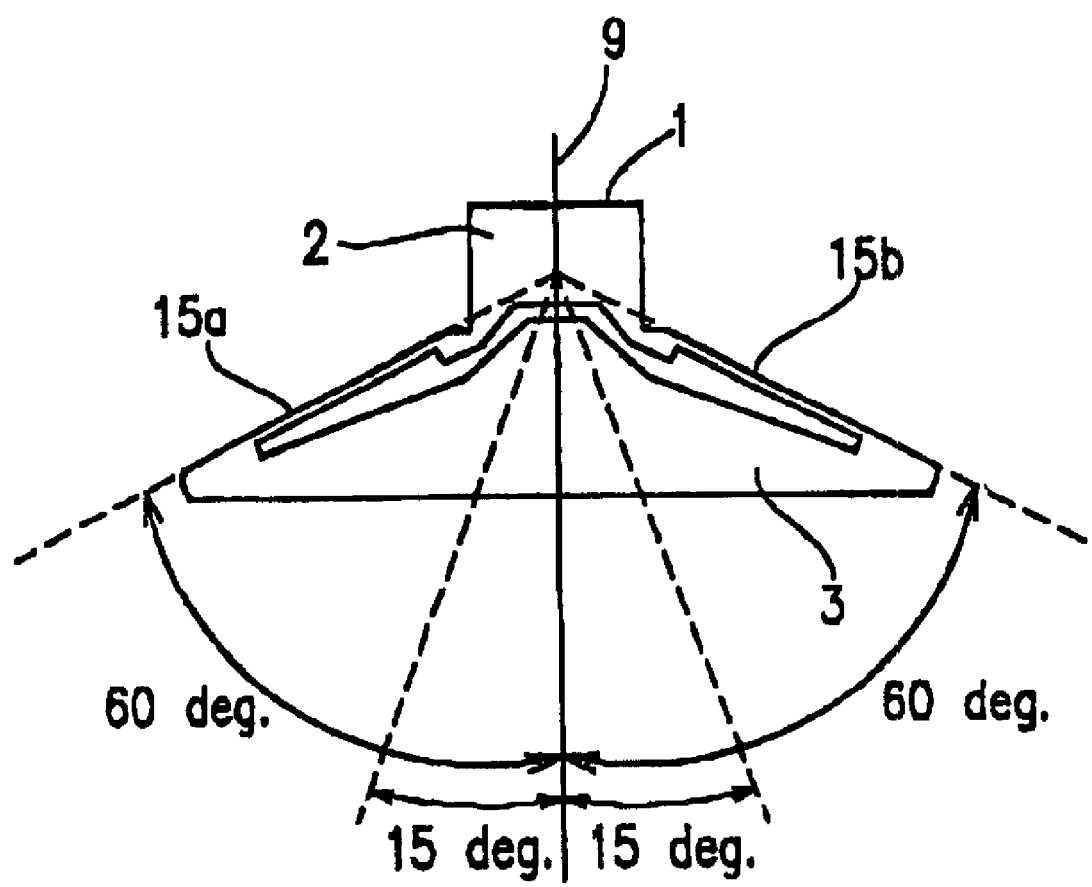
FIG. 25 is a diagram illustrating angles constituted by driving elements of an actuator portion and a plane perpendicular to a disk surface according to Embodiment 9.

As shown in FIG. 24C, this actuator is composed of stainless steel (about 15 to 20 μm) as a base material and thin film piezoelectrics composing the driving sub-means 15a and 15b. The driving sub-means 15a and 15b have a bent structure so as to be perpendicular to a disk surface 7. Furthermore, the driving sub-means 15a and 15b in FIG. 25 are each at an angle of 15° or more with respect to a face 9 perpendicular to the disk surface.

Figure 26A:
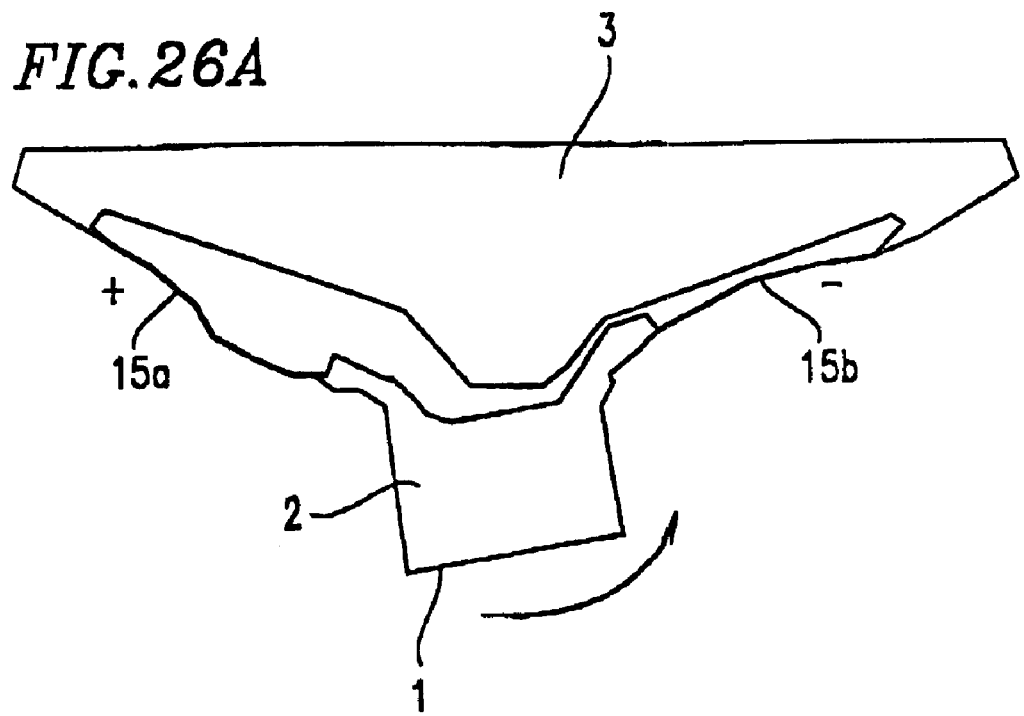
FIG. 26A and FIG. 26B are diagrams illustrating the operation of an actuator according to Embodiment 9.
Figure 26B:
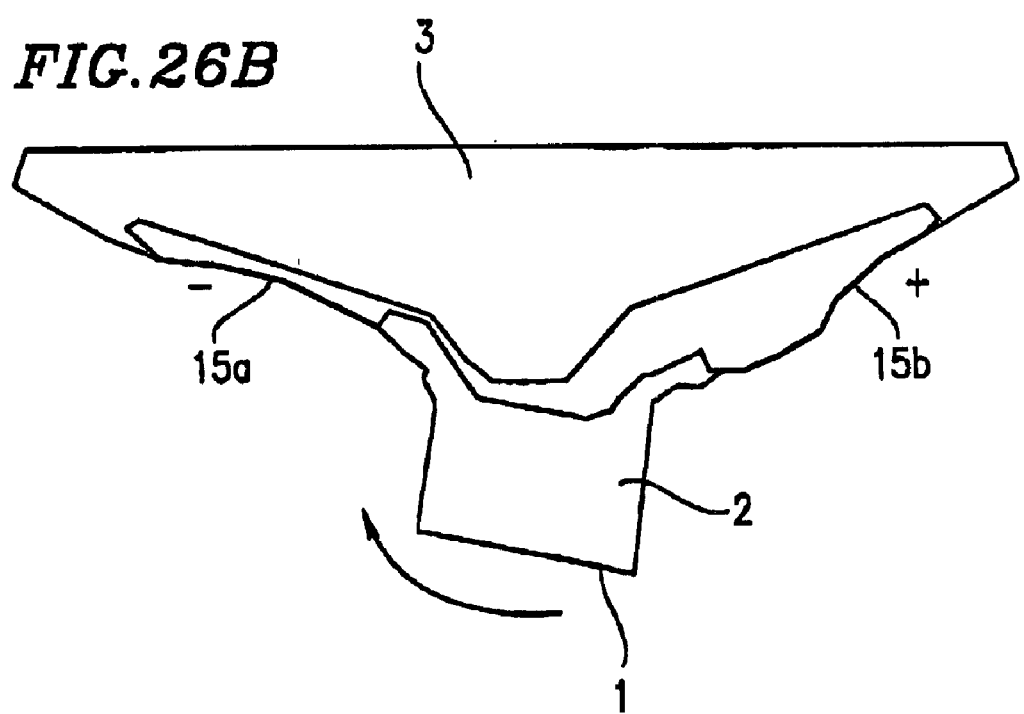

Moreover, driving voltages which are reverse-phased by 90° are supplied to the respective driving sub-means 15a and 15b, so as to repeat expansion and shrinkage. Owing to the expansion/shrinkage, the suspension 3 and slider 2 and the head element 1 fixed to the suspension 3 rotate as shown in FIG. 26A. Furthermore, by placing the driving voltages in reverse phase, the slider 2 and the head element 1 fixed to the suspension 3 rotate in an opposite direction as shown in FIG. 26B.

The driving sub-means 15a and 15b are disposed so as to be at an angle of about 15° or more with respect to the face 9 perpendicular to the disk surface. This is in order to reduce the influence (air viscosity friction force) which the slider 2 would receive from the disk rotation in the case of a small angle (about 0° to less than 15°). In accordance with the above construction, a highly precise track positioning is enabled.

Although stainless steel is employed as a base material composing the actuator, any material which possesses spring properties and heat resistance and which provides a certain level of rigidity even with a small thickness can be used.

(Embodiment 10)

Figure 27:
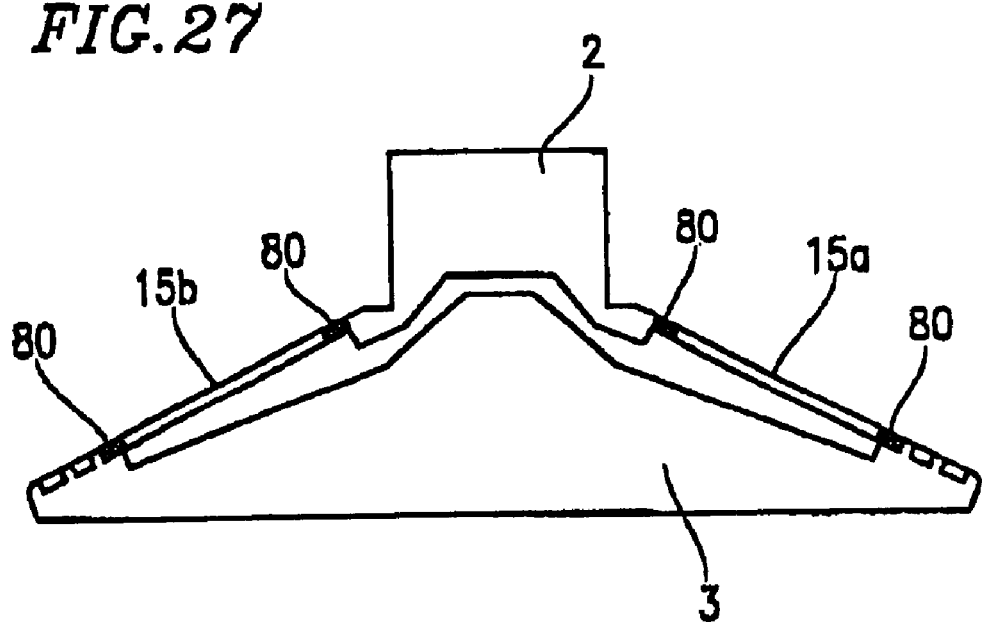
FIG. 27 is a diagram illustrating positions at which to construct a restraint alleviation means for an actuator according to Embodiment 10.

FIG. 27 illustrates a structure of a two-stage actuator according to Embodiment 4. FIG. 27 shows a restraint alleviation means 80 which is provided on driving sub-means 15a and 15b, which in turn era provided on the actuator. A restraint alleviation means may be provided on both sides as shown, or may be provided on only one side.

In the case where driving sub-means 15a and 15b without the restraint alleviation means 80 is used, a moving distance (displacement) by which the actuator rotates the slider 2 and the head element 1 fixed to the suspension 3 will be about ¼ of the distance by which each one of the driving sub-means 15a and 15b alone (i.e., in a cantilever fashion) varies.

The reason behind this is a loss which is generated due to the fact that a pair of driving sub-means have both of their ends fixed, i. e., restrained. Therefore, by providing restraint alleviation means 80 at both sides of the driving sub-means 15a and 15b, the force generated by each driving element can be efficiently transmitted to the suspension 3 and the slider 2 and the head element 1 fixed to the suspension 3. As a result, a large displacement can be obtained.

The restraint alleviation means 80 in supposed to minimize the restraint on the driving sub-means 15a and 15b. Possible methods for achieving this include reducing the rigidity at both sides of the driving sub-means 15a and 15b, and providing a spring mechanism at both sides of the driving sub-means 15a and 15b.

Figure 28A:
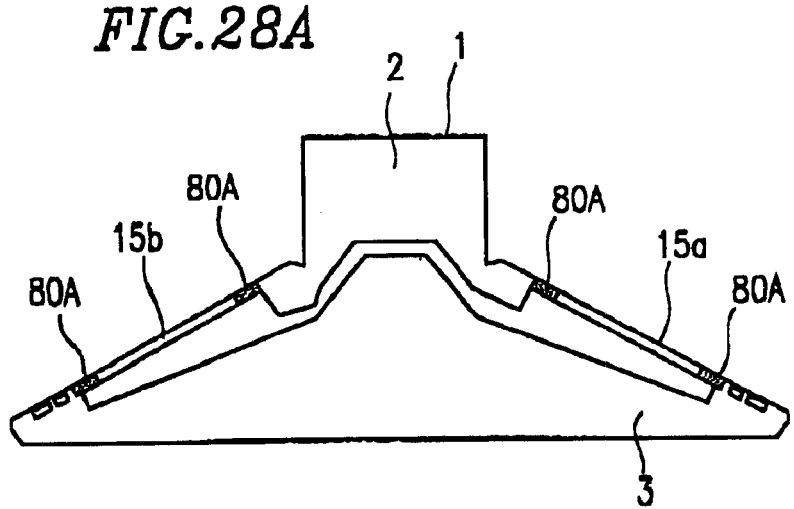
FIG. 28A is a diagram illustrating an example of a restraint alleviation means for an actuator according to Embodiment 10.
Figure 28B:
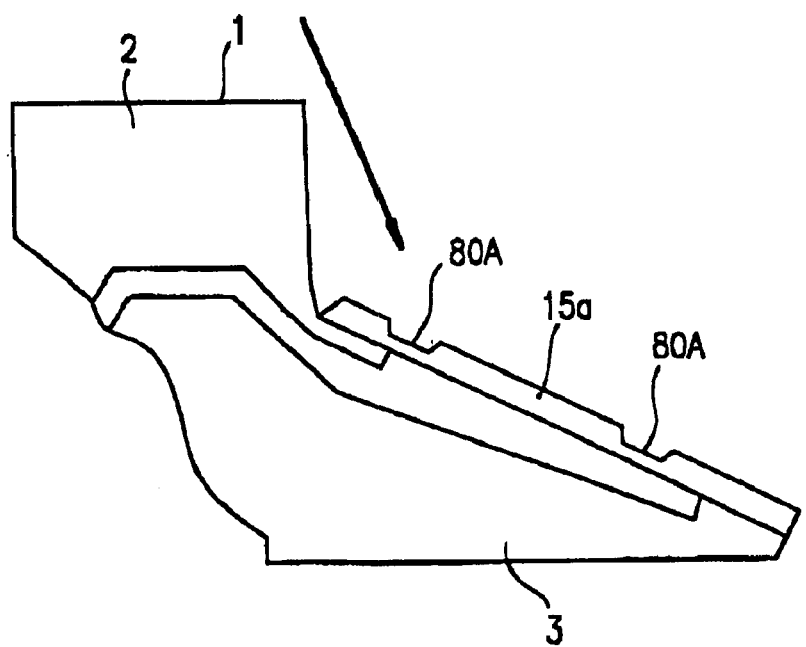
FIG. 28B is an enlarged view of a restraint alleviation means for an actuator according to Embodiment 10.

FIG. 28A shows a method of reducing the rigidity at both sides of the driving sub-sans 15a and 15b. FIG. 28B shows an enlarged view of the restraint alleviation means 80.

As a method of reducing rigidity, the thickness of both sides of the stainless steel composing the driving sub-means 15a and 15b as a base material is reduced. As shown in FIG. 28B, by reducing local thickness, the rigidity in the thinned portions 80A decreases, so that the fixed portions of driving sub-means 15a and 15b become ready to be warped.

Consequently, when driving voltages are applied to the respective driving sub-means, the portions 80A having a reduced thickness alleviate the restraint force on the driving sub-means 15a and 15b, thereby enabling efficient transmission to the suspension 3 and the slider 2 and the head element 1 fixed to the suspension S. Although stainless steel is employed as a base material composing the actuator, any material which possesses spring properties and heat resistance and which provides a certain level of rigidity even with a small thickness can be used. The structure ohm in FIGS. 28A and 28B may not have to be provided on both sides of the driving sub-means 15a and 15b, but may be provided on only one side thereof to alleviate the restraint. However, it is preferable to provide the structure on both sides.

Figure 29A:
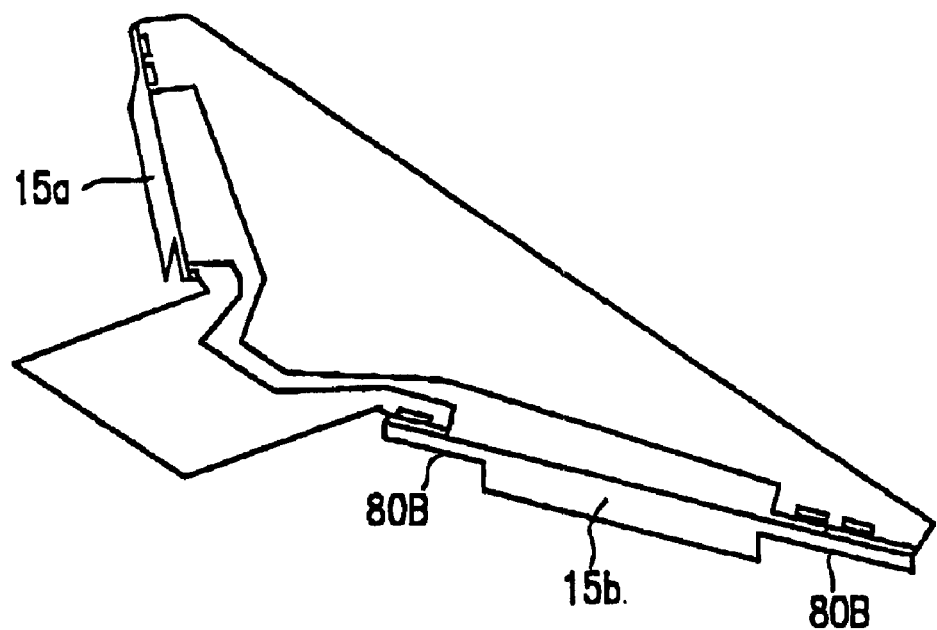
FIG. 29A is a diagram illustrating another example of a restraint alleviation means for an actuator according to Embodiment 10.

Similarly, as a method for reducing rigidity, as shown in FIGS. 29A. 29B, and 29C, both sides 80B of the driving sub-means 15a and 15b may be locally narrowed; a triangular portion 80c pointing toward an end may be formed; or a perforated portion 80C maybe formed. By these methods, the rigidity of the driving sub-means 15a and 15b is locally reduced, so that the restraint is alleviated and the displacement can be efficiently transmitted to the suspension 3 and the slider 2 and the member 1 fixed to the suspension 3. The structure shown in FIGS. 29A, 29B and 29C may not have to be provided on both sides of the driving sub-means 15a and 15b, but may be provided on only one side thereof to alleviate the restraint. However, it is preferable to provide the structure on both sides.

Figure 29B:
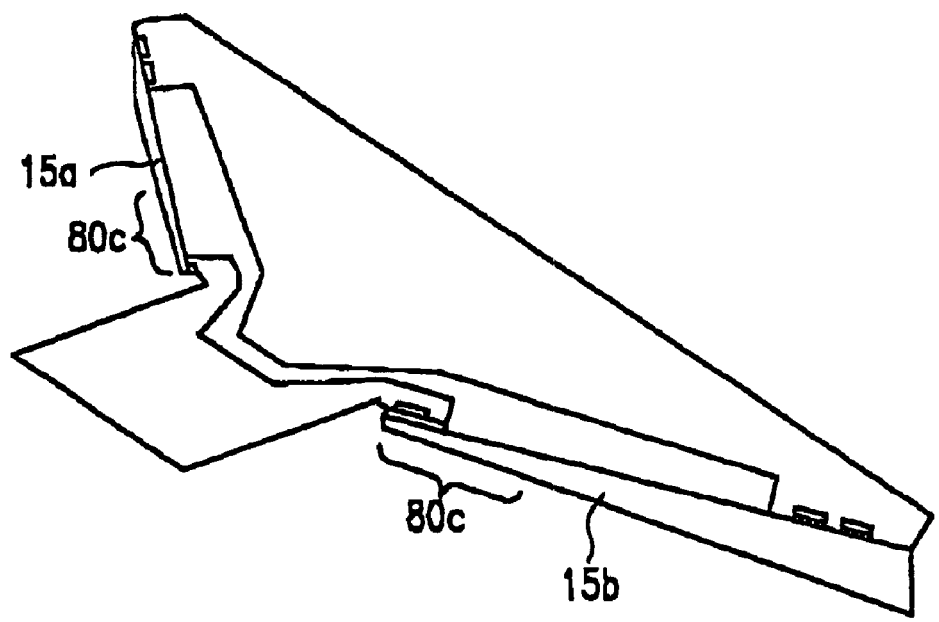
FIG. 29B is a diagram illustrating still another example of a restraint alleviation means for an actuator according to Embodiment 10.
Figure 29C:
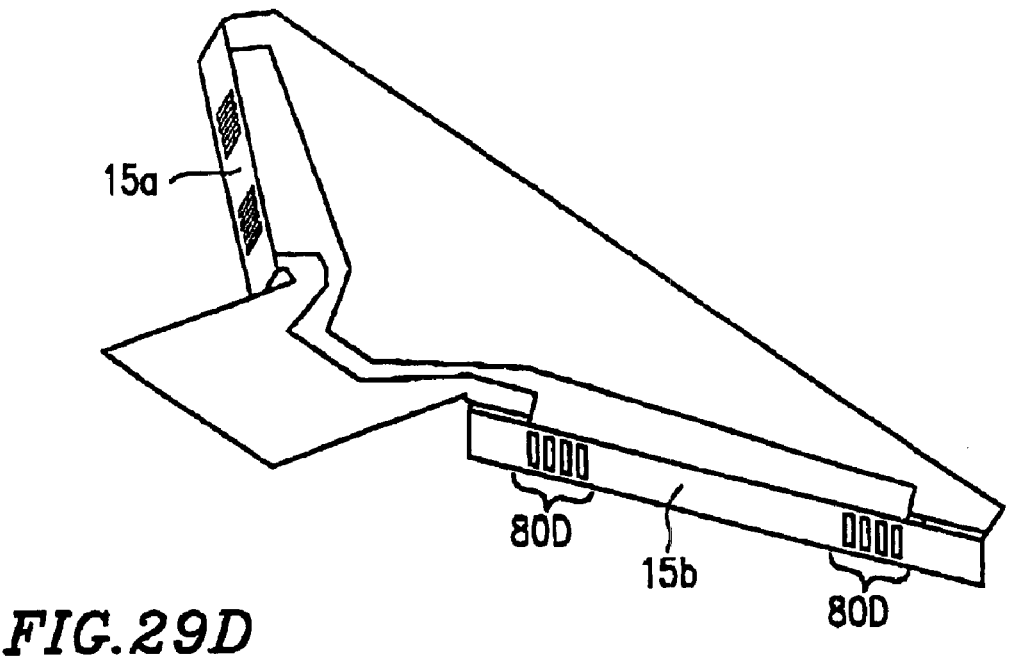
FIG. 29C is a diagram illustrating still another example of a restraint alleviation means for an actuator according to Embodiment 10.
Figure 29D:
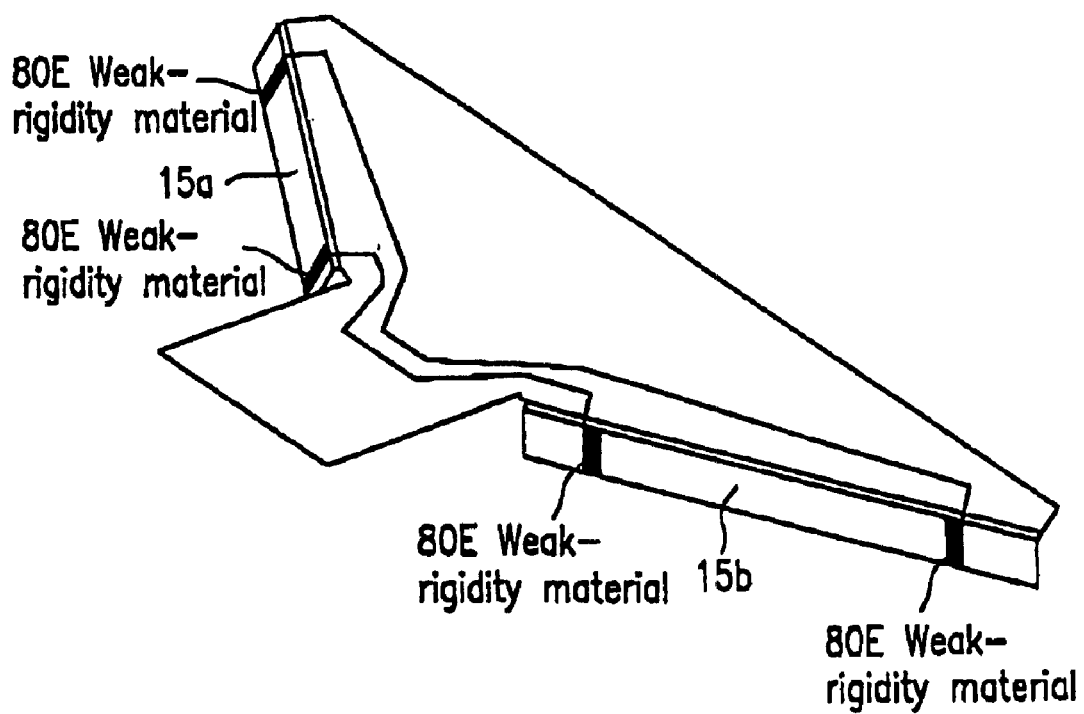
FIG. 29D is a diagram illustrating still another example of a restraint alleviation means for an actuator according to Embodiment 10.

As another method, as shown in FIG. 29D, fixed portions of driving sub-means 15a and 15b (i. e., both sides of the driving sub-means 15a and 15b) may be replaced by a material 80E (a soft material) having a lower rigidity than the bass material of the driving sub-means 15a and 15b. For example, any soft material such as polyimide (Kapton® type), polyester, polysulfone, or polytetrafluoroethylene may be used.

Embodiments 1 to 10 of the present invention illustrate the case where the bead support mechanism is composed of two major members: a flexure having micro-movement driving sub-means, which are separate from the main driving means, and having an appropriate flexural rigidity for allowing a slider to follow a waving surface of a disks; and a load beam for pressing the slider toward the surface of the disk with an appropriate force.

The essence of the present invention is not limited to the above. It will be appreciated that various structures can be contemplated to which the head support mechanism is composed of a plurality of members including a first member coupled to a slider at least carrying a head, and a second member coupled to tracking main driving means, such that the micro-moment driving means for the head is constructed on the first member.

Embodiments 1 to 10 of the present invention described above illustrate, in the case where the head support mechanism is formed through bending, a structure in which features such as the micro-movement driving sub-means, driving wiring therefore, and signal wiring are provided on one side of a base material in a stage preceding the bending. This presents a great manufacturing advantage, in the manufacture of the head support mechanism according to the present invention, in that the processed surface can be limited to one face. However, this is not to preclude a structure in which some or all of such features are provided on both sides of the base material as shown is FIG. 14.

Embodiments 1 to 10 above describe that the slider is caused to stably float at a predetermined height from the magnetic disk surface owing to the action of an air flow generated by the magnetic disk. However, a method in which a portion of an end of the magnetic head on the slider is allowed to come in contact with the magnetic disk for high density recording is also encompassed within the embodiments of the present invention.

Although Embodiments 1 to 10 illustrate magnetic disk apparatuses, the present invention is not limited thereto. By adopting a structure similar to the above embodiments for information recording apparatuses based on improvements of STM or AFM, an actuator for two-stage servo can be constructed, and effects similar to those provided by the embodiments can be obtained.

Although Embodiments 1 to 10 illustrate tracking of a magnetic disk apparatus, the present invention is not limited thereto. The present invention is applicable to the driving of various actuators. Furthermore, the present invention is applicable to any apparatuses which store information on a rotating disk surface, e. g., optical disk apparatuses, magneto-optical storage apparatuses, phase-change type optical disk apparatuses, and the like.

Moreover, it will be appreciated that the present invention is not limited to the aforementioned embodiments, and that various modifications are possible without departing from the spirit of the present invention.

EXAMPLES

Hereinafter the effects of the present invention will be described with reference to specific examples.

An actuator portion was obtained by previously etching a stainless steel substrate into an actuator configuration, with electrodes and thin film piezoelectrics formed thereon. The bending of the driving sub-means portions was carried out through presswork using a mold. Thereafter, a flexible substrate for wiring and the driving sub-means portions were electrically coupled by wire bonding.

Thereafter, a head support mechanism was constructed by combining a slider, a base plate, and a load beam.

Hereinafter, experiments which were conducted by using the above will be described.

Example 1

As a first experiment, stainless steel was processed into a cantilever shape, on which a thin film piezoelectric member (about 2.5 $\mu$m) and electrodes were formed. The displacement of the cantilever obtained by varying the stainless steel thickness was measured. The measurement was performed by measuring the displacement by a laser Doppler method. The driving voltages were constantly at ±3V, and the frequency was 1 KHz.

The results are shown in Table 1.

TABLE 1

| stainless steel thickness (μm) | 18 | 20 | 25 | 30 | 35 | 40 |
|---|---|---|---|---|---|---|
| displacement (μm) | 4.68 | 3.24 | 2.31 | 1.62 | 1.34 | 1.01 |

From the above results, a tendency was observed such that, as the stainless steel (which is the base material of the actuator) becomes smaller in thickness, the rigidity is weakened and the displacement is increased.

Example 2

As a second experiment, an actuator having restraint alleviation means constructed thereon was produced and its displacement was measured. The basic actuator structure was as follows: the driving sub-means each constituted an angle of 60° with a plane perpendicular to the disk; the stainless steel thickness was 20 μm; and the thin film piezoelectric had a thickness of 2.5 μm.

As the restraint alleviation means, as shown in FIGS. 28A and 28B, the thickness of both sides of the stainless steel base material composing the driving element portions was reduced an a means of weakening rigidity, thereby alleviating the restraint. A wet etching method was used. The measurement was performed by measuring the displacement by a laser Doppler method.

The results are shown in Table 2.

TABLE 2

| thickness of both sides (μm) | 20 | 18 | 15 | 12 | 10 | 8 | 5 |
|---|---|---|---|---|---|---|---|
| displacement (μm) | 1.02 | 1.35 | 1.71 | 2.02 | 2.54 | 3.02 | 3.71 |

From the above results, a tendency was observed such that, in the case where the thickness of both sides of the stainless steel base material composing the driving element portions was reduced so as to alleviate the restraint, a larger displacement was obtained as the restraint was alleviated more by reducing more thickness from both sides.

Example 3

As a third experiment, as in Example 2, an actuator having restraint alleviation means constructed thereon was produced and its displacement was measured. The basic actuator structure was as follows: the driving sub-means each constituted an angle of 60° with a plane perpendicular to the disk; the stainless steel thickness was 20 μm: and the thin film piezoelectric had a thickness of 2.5 μm.

With respect to the restraint alleviation means, as a means for weakening rigidity, one side of the stainless steel composing the driving element portions was shaped into a thin triangle as shown in FIG. 29B, thereby alleviating the restraint. A wet etching method was used. The measurement was performed by measuring the displacement by a laser Doppler method. As a result, the triangular driving elements provided about 1.8 times the more displacement than strip-shaped driving elements.

Example 4

As a fourth experiment, an actuator having restraint alleviation means constructed thereon was produced and its displacement was measured. The basic actuator structure was as follows: the driving sub-means each constituted an angle of 60° with a plane perpendicular to the disk; the stainless steel thickness was 20 μm; and the thin film piezoelectric had a thickness of 2.5 μm.

As for the restraint alleviation means, as shown in FIG. 29D, fixed portions of the driving sub-means were formed by using polyimide (Kapton®), a material having weaker rigidity than that of the base material of the driving sub-means. The polyimide had a thickness of 12 μm. The polyimide and the base material of the driving sub-means (stainless steel) was jointed with an adhesive. The measurement was performed by measuring the displacement by a laser Doppler method. As a result, about 1.9 times more displacement was obtained than the case where the fixed portions of the driving sub-means were not formed of a material having weaker rigidity.

Example 5

As a fifth experiment, an actuator having restraint alleviation means constructed thereon was produced and its displacement was measured. The basic actuator structure was as follows: the driving sub-means each constituted an angle of 60° with a plane perpendicular to the disk; the stainless steel thickness was 20 μm; and the thin film piezoelectric had a thickness of 2.5 μm.

Figure 30A:
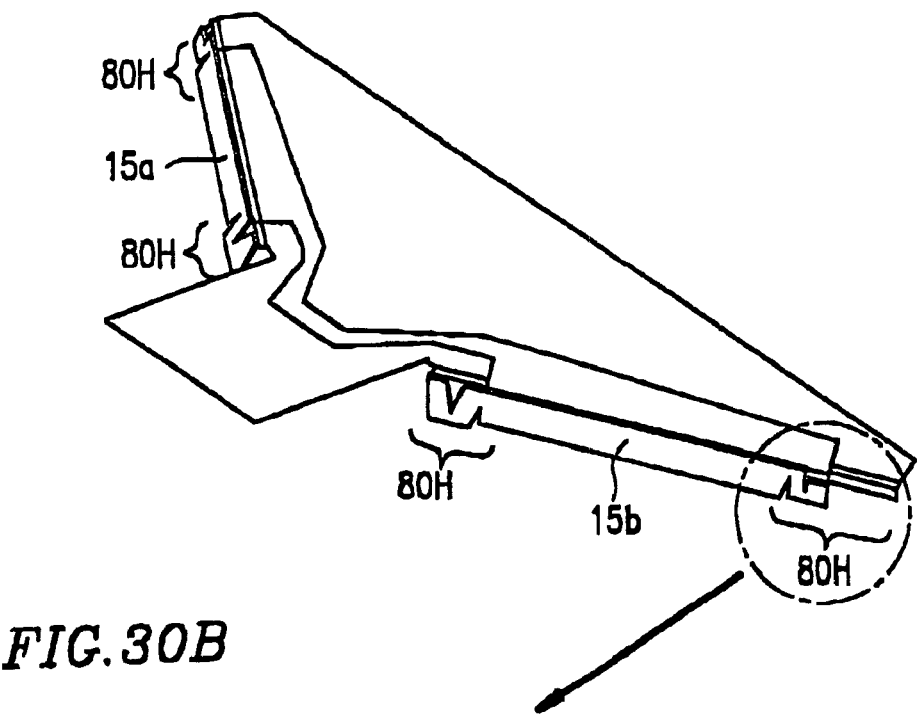
FIGS. 30A and 30B are diagrams illustrating still another example of a restraint alleviation means for an actuator according to Embodiment 10.
Figure 30B:
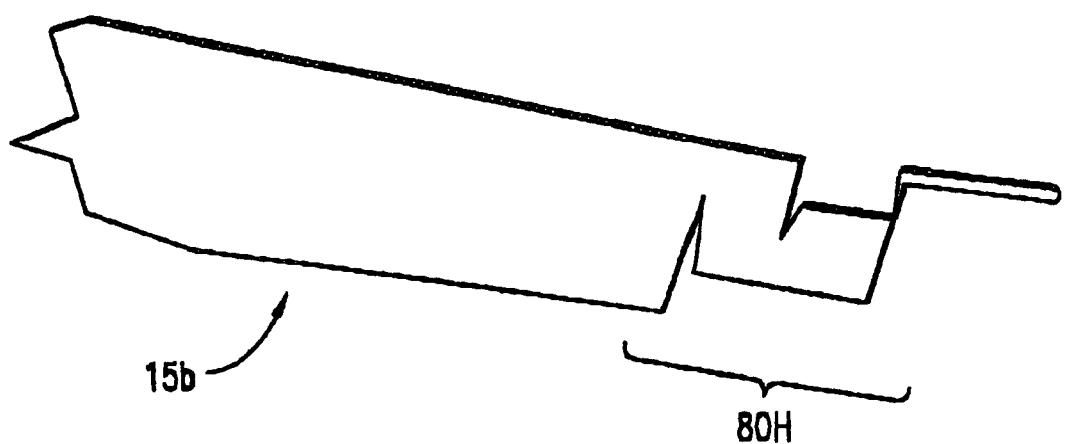

As for the restraint alleviation means, as shown in FIGS. 30A and 30B, several notches were provided at both sides of the driving sub-means, and these portions were bent through presswork using a mold.

By gradually bending the notched portions, the driving sub-means are approximately 90° with respect to the disk surface without having a crease.

Since the notches were provided, the electrodes on the driving sub-means portions were allowed to be gradually bent during the bending process, so that they were able to be positioned on a face rotated by 90° without being destroyed. The measurement was performed by measuring the displacement by a laser Doppler method. As a result, about 3.1 times more displacement was obtained than the case where the restraint alleviation mechanism was not employed.

Similar measurements were taken by providing the restraint alleviation mechanism on one side of the driving sub-means where the slider was affixed, rather than both sides of the driving sub-means. As a result, about 2 to 3 times more displacement was obtained than the case where the restraint alleviation mechanism was not employed.

INDUSTRIAL APPLICABILITY

Thus, according to the present invention, there is provided an outstanding effect in that high-speed and high-precision tracking is realized so as to be compatible with narrow track pitches required due to an increasing recording density, with ease of production and with a low driving voltage at a practical level.

What is claimed is:

1. An information recording/reproducing apparatus comprising:
 a head support mechanism including a head and a slider for carrying the head;
 main driving means for driving the head via the head support mechanism,
 wherein the head support mechanism further includes:
 a load beam;
 a member for supporting the slider, the member being coupled to one end of the load beam;

a first thin plate formed on the member;
a first driving sub-means including a first thin film which is affixed on the first thin plate;
a second thin plate formed on the member, the second thin plate being different from the first thin plate; and
a second driving sub-means including a second thin film which is affixed on the second thin plate,
wherein the first and second driving sub-means are configured to be driven so that one of the first and second driving sub-means expands along a longitudinal direction of one of the first and second thin films while the other of the first and second driving sub-means shrinks along a longitudinal direction of the other of the first and second thin films, thereby causing a flexural deformation of each of the first and second thin plates such that a micro-movement of the head is performed along a tracking direction.

2. An information recording/reproducing apparatus according to claim 1, wherein each of the first and second thin films has a film thickness equal to or less than 10 µm.

3. An information recording/reproducing apparatus according to claim 1, wherein:
each of the first and second thin films is formed on a base material and has a film thickness equal to or less than 10 µm; and
each of the thin first and second films is formed on the base material by using a film growth process.

4. An information recording/reproducing apparatus according to claim 3, wherein the film growth process comprises a direct film growth process.

5. An information recording/reproducing apparatus according to claim 3, wherein the film growth process comprises a transcription process.

6. An information recording/reproducing apparatus according to claim 1, wherein the plurality of plate spring portions of the head support mechanism are disposed in a radial arrangement from a rotation center of the slider;
the first and second driving sub-means rotates the slider around the rotation center such that a micro-movement of the head is performed along a tracking direction.

7. An information recording/reproducing apparatus comprising:
a head support mechanism having a head and a slider for carrying the head, and a thin metal plate, said thin metal plate including a bent portion which is formed by bending;
main driving means for causing the head to track via the head support mechanism, so that information on a disk is recorded/reproduced by means of the head, wherein:
the head support mechanism comprises driving sub-means comprising a thin film and causing the head to have a micro-movement, said driving sub-means being formed on the bent portion; and
the driving sub-means causes the head to have a micro-movement by utilizing flexural deformation of the thin film.

8. An information recording/reproducing apparatus according to claim 7, wherein the thin film is formed so that the thickness direction substantially coincides with a tracking direction of the head.

9. An information recording/reproducing apparatus according to claim 7, wherein the thin film has a film thickness equal to or less than 10 µm.

10. An information recording/reproducing apparatus according to claim 7, wherein a main portion of a member comprised by the driving sub-means is disposed in a space within the thickness, from the disk surface, of the slider along a height direction.

11. An information recording/reproducing apparatus according to claim 7, wherein the driving sub-means is in the vicinity of a position along a height direction from the disk surface of a center of gravity of the slider.

12. An information recording/reproducing apparatus according to claim 7, wherein the head support mechanism includes a plurality of thin plate spring portions formed substantially perpendicular to the disk surface.

13. An information recording/reproducing apparatus according to claim 12, wherein:
the driving sub-means further comprises a base material to function as an actuating plate; and
the base material comprises a spring material.

14. An information recording/reproducing apparatus according to claim 7, wherein the driving sub-means is of a piezoelectric type, electrostatic type, electromagnetic type, magnetostrictive type, or shape memory alloy type.

15. An information recording/reproducing apparatus according to claim 7, wherein the driving sub-means comprises a piezoelectric material, electrostrictive material, or magnetostrictive material.

16. An information recording/reproducing apparatus according to claim 7, wherein the head support mechanism comprises:
a first member coupled to the slider; and
a second member coupled to the main driving means, wherein the driving sub-means is formed on the first member.

17. An information recording/reproducing apparatus according to claim 16, wherein the first member comprises a flexure for causing the slider to follow the disk surface.

18. An information recording/reproducing apparatus according to claim 7, wherein:
the bent portion is bent in a direction which is substantially perpendicular to the disk surface; and
the bent portion includes a grooved portion for enhancing the processing precision of the bending.

19. An information recording/reproducing apparatus according to claim 7, wherein:
the bent portion is formed so that its bent height dimension is smaller than a dimension of the slider along a first direction which is a rotation axis direction of the disk; and
a dimension of the driving sub-means along the first direction is smaller than the dimension of the slider along the first direction.

20. An information recording/reproducing apparatus according to claim 7, wherein:
the head support mechanism further comprises a driving sub-means formation member on which the driving sub-means is formed; and
recording/reproducing signal wiring coupled to the head is formed on the driving sub-means formation member.

21. An information recording/reproducing apparatus according to claim 7, wherein:
the plurality of plate spring portions of the head support mechanism are a plurality of parallel springs formed substantially perpendicular to the disk surface; and
the driving sub-means translates the head along a tracking direction.

22. An information recording/reproducing apparatus according to claim 7, wherein:
the plurality of plate spring portions of the head support mechanism are disposed in a radial arrangement from a rotation center of the slider; and the driving sub-means rotates the slider around the rotation center, and causes the head to have a micro-movement along a tracking direction.

23. An information recording/reproducing apparatus according to claim 22, wherein the plurality of plate spring portions comprise a plate spring portion having a longitudinal direction along the tracking direction.

24. An information recording/reproducing apparatus according to claim 22, wherein the plurality of plate spring portions comprise a plate spring portion having a longitudinal direction along a direction substantially perpendicular to the tracking direction.

25. An information recording/reproducing apparatus according to claim 7, wherein the head support mechanism comprises a pair of driving sub-means.

26. An information recording/reproducing apparatus according to claim 7, wherein the driving sub-means is located so as to be substantially parallel to a direction in which the slider is disposed.

27. An information recording/reproducing apparatus according to claim 7, wherein the driving sub-means are disposed in such a manner that extensions of directions in which the driving sub-means are disposed constitute predetermined angles with respect to an extension of a direction in which the slider is disposed, so as to intersect at a leading end of the head support mechanism.

28. An information recording/reproducing apparatus according to claim 22, wherein the driving sub-means constitutes an angle equal to or greater than 15° with a plane perpendicular to disk surface.

29. An information recording/reproducing apparatus according to claim 7, wherein:
the head support mechanism further comprises a first member coupled to the slider;
the driving sub-means is formed on the first member;
and the driving sub-means are disposed in such a manner that a center of gravity of the first member is located in the vicinity of an intersection between extensions of directions in which the driving sub-means are disposed.

30. An information recording/reproducing apparatus according to claim 7, wherein the head support mechanism comprises two or more pairs of driving sub-means.

31. An information recording/reproducing apparatus according to claim 7, wherein the driving sub-means is formed by using a semiconductor process.

32. An information recording/reproducing apparatus according to claim 7, wherein the driving sub-means comprises restraint alleviation means for restraining at least a portion of the thin film.

33. An information recording/reproducing apparatus according to claim 32, wherein the restraint alleviation means comprises means for weakening the rigidity of the driving sub-means.

34. An information recording/reproducing apparatus according to claim 32, wherein the restraint alleviation means comprises a spring structure.

35. An information recording/reproducing apparatus according to claim 32, wherein the restraint alleviation means comprises a low rigidity material.

36. An information recording/reproducing apparatus according to claim 32, wherein the restraint alleviation means comprises wiring for applying to the thin film a driving voltage for driving the thin film.

37. An information recording/reproducing apparatus according to claim 7, wherein the information recording/reproducing apparatus further comprises control means for controlling the main driving means and the driving sub-means.

38. An information recording/reproducing apparatus according to claim 7, wherein:
the thin film is formed on a base material; and
the thin film is formed on the base material by using a film growth process.

39. An information recording/reproducing apparatus according to claim 38, wherein the film growth process comprises a direct film growth process.

40. An information recording/reproducing apparatus according to claim 39, wherein the thin film comprises a metal film, an underlying layer, a thin film piezoelectric, and a metal electrode film, which are sequentially layered on the base material.

41. An information recording/reproducing apparatus according to claim 39, wherein the thin film comprises an insulation film, a metal film, an underlying layer, a thin film piezoelectric, and a metal electrode film, which are sequentially layered on the base material.

42. An information recording/reproducing apparatus according to claim 39, wherein the thin film comprises a metal film, an underlying layer, a thin film piezoelectric, and a metal electrode film, which are sequentially layered on the base material in a vacuum chamber.

43. An information recording/reproducing apparatus according to claim 39, wherein the thin film comprises an insulation film, a metal film, an underlying layer, a thin film piezoelectric, and a metal electrode film, which are sequentially layered on the base material in a vacuum chamber.

44. An information recording/reproducing apparatus according to claim 39, wherein:
the thin film comprises a metal film; and
the metal film is formed by either a vacuum process or a process in a liquid.

45. An information recording/reproducing apparatus according to claim 38, wherein the film growth process comprises a transcription process.

46. An information recording/reproducing apparatus according to claim 45, wherein the thin film is formed of a multilayer film having a metal film, a thin film piezoelectric, an underlying layer, and a metal electrode film, adhered on the base material.

47. An information recording/reproducing apparatus according to claim 38, wherein the thin film and the slider are disposed along a tracking direction of the head.

48. An information recording/reproducing apparatus according to claim 38, wherein the thin film is formed on the base material in such a manner that the thickness direction substantially coincides with a tracking direction of the head.

49. An information recording/reproducing apparatus according to claim 38, wherein the thin film is formed on the base material in such a manner that the thickness direction is substantially perpendicular to the disk surface.

50. An information recording/reproducing apparatus according to claim 38, wherein:
the base material is elastic; and
the base material has a thickness such that a flexural rigidity required for allowing the slider to follow the waving disk surface and a displacement required for tracking are both obtained.

51. An information recording/reproducing apparatus according to claim 50, wherein the thickness of the base material is equal to or greater than 0.5 $\mu$m and equal to or less than 50 $\mu$m.

52. An information recording/reproducing apparatus according to claim 38, wherein the base material is formed of stainless steel.

53. An information recording/reproducing apparatus according to claim 38, wherein the base material is formed of silicon.

54. An information recording/reproducing apparatus according to claim 38, wherein:

the thin film comprise a thin film piezoelectric; and the thin film piezoelectric is formed by an rf sputtering method, an ion beam sputtering method, a sol-gel method, a CVD method, or a laser ablation method.

55. An information recording/reproducing apparatus according to claim 54, wherein the thin film piezoelectric comprises a PZT film.

56. An information recording/reproducing apparatus according to claim 54, wherein the thin film piezoelectric comprises a ZnO film.

57. An information recording/reproducing apparatus according to claim 38, wherein the thin film piezoelectric comprises a PVDF film.

58. An information recording/reproducing apparatus according to claim 38, wherein the thin film is formed on both sides of the base material so as to interpose the base material therebetween.

59. An information recording/reproducing apparatus according to claim 38, wherein:

the thin film comprises a thin film piezoelectric; and the thin film piezoelectric is entirely covered by an insulation film.

60. An information recording/reproducing apparatus according to claim 59, wherein the insulation film comprises a material whose main component is polyimide, an SAM film, an LB film, or a nitride.

61. An information recording/reproducing apparatus according to claim 7, wherein:

the thin film comprises a pair of thin films;

the pair of thin films are disposed substantially parallel to the disk surface; and voltages having reverse phases are applied to the thin film provided on one side of the head and the thin film provided on the other side of the head so that the thin films warp in opposite directions.

62. An information recording/reproducing apparatus according to claim 7, wherein:

the thin film comprises a pair of thin films;

the pair of thin films are disposed substantially parallel to the disk surface; and voltages having the same phase are applied to the thin film provided on one side of the head and the thin film provided on the other side of the head so that the thin films warp in the same direction.

63. An information recording/reproducing apparatus according to claim 38, wherein the thin film comprises an underlying layer.

64. An information recording/reproducing apparatus according to claim 63, wherein the underlying layer comprises a PT layer, a PLT layer, a PBTiO3 layer, an SrTiO3 layer, or a BaTiO3 layer.

65. An information recording/reproducing apparatus according to claim 64, wherein the PLT layer contains substantially no Zr.

66. An information recording/reproducing apparatus according to claim 63, wherein:

the thin film comprises a metal film which is layered adjacent to the underlying layer; and the metal film comprises either a platinum film or a titanium film.

67. An information recording/reproducing apparatus according to claim 38, wherein the base material includes wiring for applying a voltage to the thin film.

68. An information recording/reproducing apparatus according to claim 67, wherein the wiring is formed after the thin film is formed on the base material.

* * * * *